(12) United States Patent
Garrett et al.

(10) Patent No.: US 12,373,818 B2
(45) Date of Patent: *Jul. 29, 2025

(54) SYSTEMS AND METHODS FOR SECURELY GENERATING AND PRINTING A DOCUMENT

(71) Applicant: Capital One Services, LLC, McLean, VA (US)

(72) Inventors: Jade Garrett, Sterling, VA (US); David Kelly Wurmfeld, Palm Bay, FL (US); Michael Littlejohn, Fairfax, VA (US); Michael Louie, Spotsylvania, VA (US); Michael Canavatchel, Midlothian, VA (US); Spencer Cutrell, Arlington, VA (US); Steve Faletti, Brooklyn, NY (US); Rex Lacy, Sterling, VA (US); Alexander Medeiros, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/810,656

(22) Filed: Aug. 21, 2024

(65) Prior Publication Data

US 2024/0412193 A1 Dec. 12, 2024

Related U.S. Application Data

(63) Continuation of application No. 18/467,378, filed on Sep. 14, 2023, now Pat. No. 12,099,990, which is a
(Continued)

(51) Int. Cl.
*G06Q 20/32* (2012.01)
*G06F 21/31* (2013.01)
(Continued)

(52) U.S. Cl.
CPC ........ *G06Q 20/3274* (2013.01); *G06F 21/31* (2013.01); *G06K 19/06037* (2013.01);
(Continued)

(58) Field of Classification Search
None
See application file for complete search history.

(56) References Cited

U.S. PATENT DOCUMENTS

| 8,985,437 | B2 | 3/2015 | Burkhart et al. |
| 9,286,560 | B2 | 3/2016 | Burkhart et al. |

(Continued)

FOREIGN PATENT DOCUMENTS

| WO | 9909470 A1 | 2/1999 | |
| WO | WO-2019016438 A1 * | 1/2019 | ........... G06F 3/1222 |

OTHER PUBLICATIONS

International Search Report and Written Opinion in Application No. PCT/US2022/033566, dated Sep. 8, 2022 (35 pages).
(Continued)

*Primary Examiner* — Kristy A Haupt
(74) *Attorney, Agent, or Firm* — Bookoff McAndrews, PLLC

(57) ABSTRACT

Systems and methods for securely generating and printing documents are disclosed. For example, processor(s) of a computer system may receive information for the document from a computing device through a network, verify the information for the document, and upon verification, generate document generation data using at least a portion of the information for the document. The document generation data may include document metadata that enables generation of an image of the document and/or the image of the document. Upon the processor(s) verifying first authentication information of a first code associated with a printing device received from the computing device through the
(Continued)

network and second authentication information of a second code associated with the computing device received from the printing device through the network, the processor(s) may transmit the document generation data to the printing device through the network, and cause the printing device to print the image of the document.

19 Claims, 16 Drawing Sheets

Related U.S. Application Data continuation of application No. 18/126,187, filed on Mar. 24, 2023, now Pat. No. 11,797,974, which is a continuation of application No. 17/658,191, filed on Apr. 6, 2022, now Pat. No. 11,636,464, which is a continuation-in-part of application No. 17/539,350, filed on Dec. 1, 2021, now Pat. No. 11,587,064, which is a continuation of application No. 17/358,762, filed on Jun. 25, 2021, now Pat. No. 11,222,326.

(51) Int. Cl.
| | |
|---|---|
| *G06K 1/12* | (2006.01) |
| *G06K 19/06* | (2006.01) |
| *G06Q 20/04* | (2012.01) |
| *G06Q 20/10* | (2012.01) |
| *G06Q 20/18* | (2012.01) |
| *G06Q 20/20* | (2012.01) |
| *G06Q 20/40* | (2012.01) |
| *G06Q 40/02* | (2023.01) |
| *H04W 12/06* | (2021.01) |
| *H04W 76/10* | (2018.01) |

(52) U.S. Cl.
CPC ..... *G06K 19/06112* (2013.01); *G06Q 20/042* (2013.01); *G06Q 20/204* (2013.01); *G06Q 20/208* (2013.01); *G06Q 20/3272* (2013.01); *G06Q 20/3276* (2013.01); *G06Q 20/3278* (2013.01); *G06Q 20/40145* (2013.01); *G06Q 40/02* (2013.01); *H04W 12/06* (2013.01); *H04W 76/10* (2018.02); *G06K 1/121* (2013.01); *G06Q 20/1085* (2013.01); *G06Q 20/18* (2013.01); *G06Q 20/3223* (2013.01)

(56) References Cited

U.S. PATENT DOCUMENTS

| | | | |
|---|---|---|---|
| 9,892,116 | B2 | 2/2018 | Metso |
| 10,032,057 | B2 | 7/2018 | Burkhart et al. |
| 10,360,425 | B2 | 7/2019 | Burkhart et al. |
| 10,735,436 | B1 | 8/2020 | Chernilovsky et al. |
| 10,769,625 | B2 | 9/2020 | Pandiarajan et al. |
| 10,867,147 | B2 | 12/2020 | Burkhart et al. |
| 11,222,326 | B1 | 1/2022 | Wurmfeld |
| 11,797,974 | B2 | 10/2023 | Garrett et al. |
| 2005/0114703 | A1* | 5/2005 | Allen, Jr. ............... G06Q 30/02 726/4 |
| 2006/0119885 | A1 | 6/2006 | Jeon et al. |
| 2009/0213425 | A1 | 8/2009 | Oishi |
| 2010/0309505 | A1 | 12/2010 | Partridge et al. |
| 2012/0038940 | A1 | 2/2012 | Boskovic |
| 2013/0085968 | A1 | 4/2013 | Schultz et al. |
| 2013/0201518 | A1 | 8/2013 | Pan et al. |
| 2013/0306721 | A1 | 11/2013 | Meng |
| 2014/0231504 | A1 | 8/2014 | DeRoos et al. |
| 2015/0006382 | A1 | 1/2015 | Scipioni |
| 2015/0244715 | A1 | 8/2015 | Narayan et al. |
| 2017/0017866 | A1 | 1/2017 | Nithianand et al. |
| 2018/0096155 | A1 | 4/2018 | Ryu et al. |
| 2018/0227446 | A1* | 8/2018 | Yamamoto ......... H04N 1/00095 |
| 2019/0332340 | A1 | 10/2019 | Somaiah et al. |
| 2020/0153986 | A1 | 5/2020 | Doi |
| 2020/0379699 | A1* | 12/2020 | Alacar ................. H04L 9/3226 |
| 2020/0380493 | A1 | 12/2020 | Morales et al. |
| 2021/0142314 | A1 | 5/2021 | Pharr et al. |

OTHER PUBLICATIONS

International Search Report and Written Opinion in Application No. PCT/US2022/072923, dated Sep. 22, 2022 (16 pages).

\* cited by examiner

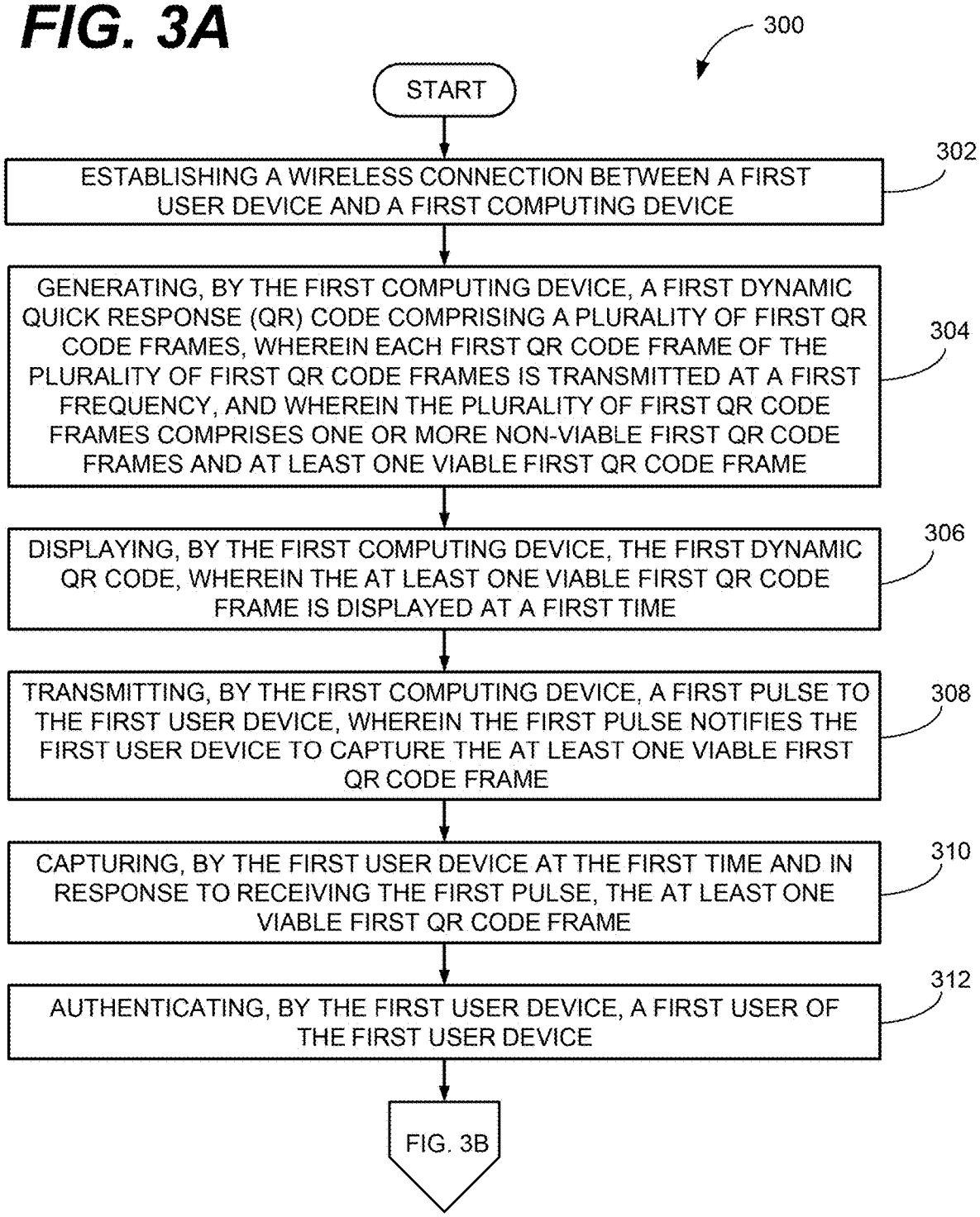

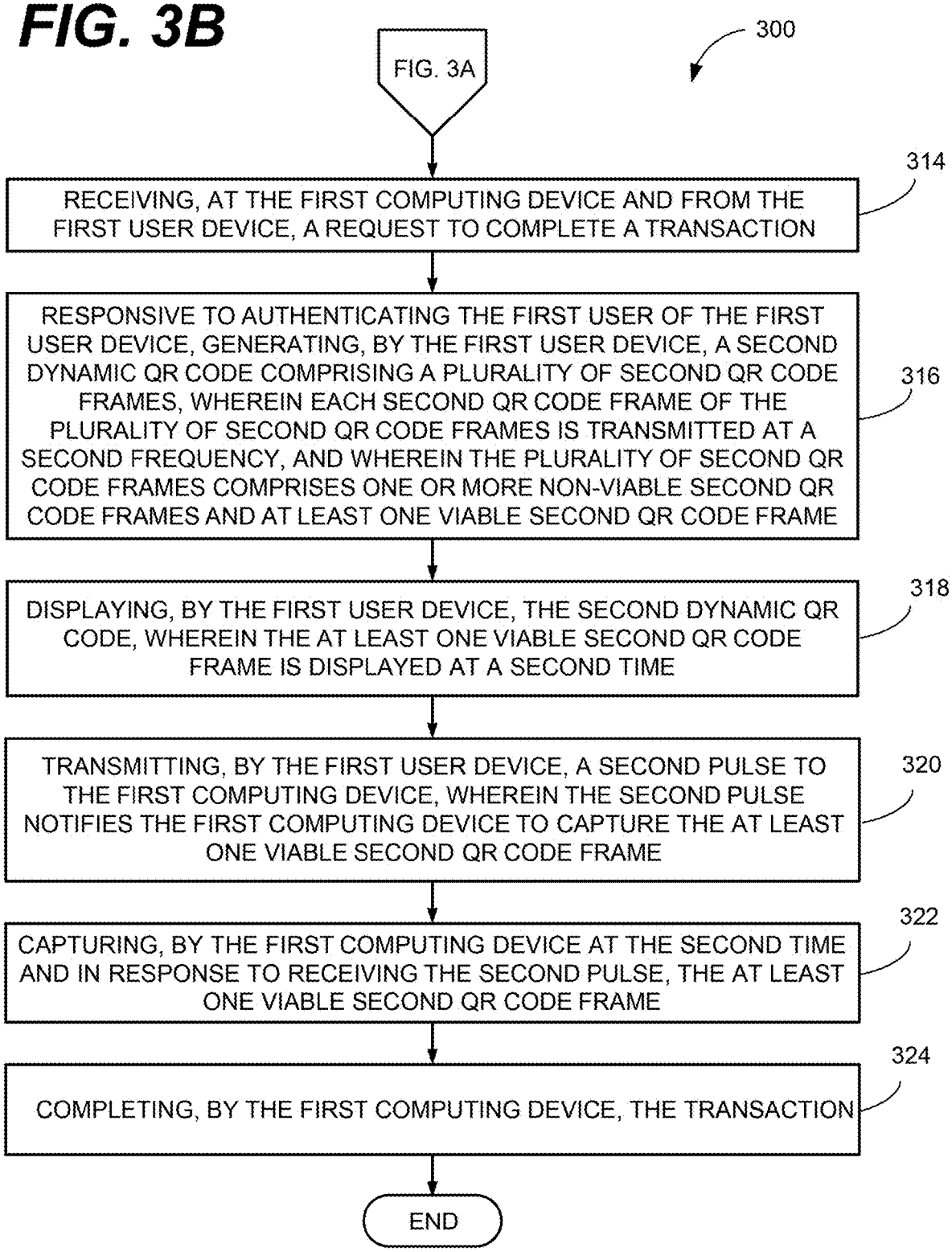

FIG. 7E

710 — ✕
PRINT A CASHIER'S CHECK
< EDIT ACCOUNT

ENTER CASHIER'S CHECK DETAILS

CHECKING ... 1234
$1234.00 AVAILABLE BALANCE

PAYEE NAME
710A — [ FULL NAME ]
FULL NAME OF PERSON OR BUSINESS RECEIVING THIS CASHIER'S CHECK

AMOUNT
710B — [ $0.00 ]
MAX AMOUNT: $3,000 PER CUSTOMER PER DAY

MEMO (OPTIONAL)                0/25
710C — [ MEMO CHARACTER LIMIT: 25 ]

710D — [ REVIEW CHECK DETAILS ]

FIG. 7F

710 — ✕
PRINT A CASHIER'S CHECK
< EDIT ACCOUNT

ENTER CASHIER'S CHECK DETAILS

CHECKING ... 1234
$1234.00 AVAILABLE BALANCE

PAYEE NAME
710A — [ FULL NAME ]
FULL NAME OF PERSON OR BUSINESS RECEIVING THIS CASHIER'S CHECK

AMOUNT
710B — [ $20,000 ]
THIS IS MORE MONEY THAN YOU HAVE IN THE ACCOUNT YOU SELECTED
MAX AMOUNT: $3,000 PER CUSTOMER PER DAY

MEMO (OPTIONAL)                0/25
710C — [ MEMO CHARACTER LIMIT: 25 ]

710D — [ REVIEW CHECK DETAILS ]

FIG. 7G

710 — PRINT A CASHIER'S CHECK
ENTER CASHIER'S CHECK DETAILS
CHECKING ... 1234
$1234.00 AVAILABLE BALANCE
PAYEE NAME
710A — JOHN DOE
FULL NAME OF PERSON OR BUSINESS RECEIVING THIS CASHIER'S CHECK
AMOUNT
710B — $1,000
MAX AMOUNT: $3,000 PER CUSTOMER PER DAY
MEMO (OPTIONAL)    11/25
710C — CAR PURCHASE
710D — REVIEW CHECK DETAILS

FIG. 7H

712 — PRINT A CASHIER'S CHECK
CONFIRM YOUR CASHIER'S CHECK DETAILS
CHECK EACH BOX TO CONFIRM WE HAVE THE RIGHT ACCOUNT, AMOUNT, PAYEE NAME, AND MEMO.
ACCOUNT          ☑ — 712A
   CHECKING ... 1234
PAYEE            ☑
   JOHN DOE
AMOUNT           ☑
   $1,000
MEMO             ☑
   CAR PURCHASE
712B — CONFIRM CHECK DETAILS

SYSTEMS AND METHODS FOR SECURELY GENERATING AND PRINTING A DOCUMENT

CROSS-REFERENCE TO RELATED APPLICATION(S)

This patent application is a continuation of and claims the benefit of priority to U.S. Nonprovisional patent application Ser. No. 18/467,378, filed on Sep. 14, 2023, which is a continuation of U.S. Nonprovisional patent application Ser. No. 18/126,187, filed on Mar. 24, 2023, now U.S. Pat. No. 11,797,974, which is a continuation of U.S. Nonprovisional patent application Ser. No. 17/658,191, filed on Apr. 6, 2022, now U.S. Pat. No. 11,636,464, which is a continuation-in-part of U.S. Nonprovisional patent application Ser. No. 17/539,350, filed on Dec. 1, 2021, now U.S. Pat. No. 11,587,064, which is a continuation of and claims the benefit of priority to U.S. Nonprovisional application Ser. No. 17/358,762, filed on Jun. 25, 2021, now U.S. Pat. No. 11,222,326, the entireties of all of which are herein incorporated by reference.

TECHNICAL FIELD

Various embodiments of the present disclosure relate generally to systems and methods for validating customer interactions, and more particularly for generating a dynamic quick response (QR) code to iteratively validate customer interactions.

Additional embodiments of the present disclosure relate generally to printing documents, and, more particularly, to systems and methods for securely generating and printing a document.

BACKGROUND

Many traditional systems and methods utilize QR codes or other two-dimensional encoded graphics to initiate and/or authenticate interactions between customers and financial transaction terminals, such as ATMs and other kiosks. Traditional graphics used in these circumstances can be easily intercepted by unintended actors, such as people standing in line behind a customer at an ATM, thereby leading to increased financial fraud.

Additionally, some types of documents, such as cashier's checks or other types of secure documents, may require certain security features in generating and issuing the document. These required security features may make it difficult to print these types of documents. Further, the information for such documents may be prone to fraud, and thus may also further difficulties of printing such documents without the use of an authorized user (e.g., a bank teller). Accordingly, a need exists for securely generating and printing documents that require certain security features.

The systems and methods of the present disclosure may solve one or more of the problems set forth above and/or other problems in the art. The scope of the current disclosure, however, is not defined by the attached claims, and not by the ability to solve any specific problem. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for iteratively validating customer interactions using a dynamic QR code.

For example, in one embodiment, a method for validating customer interactions may include establishing a wireless connection between a first user device (e.g., a mobile phone) and a first computing device (e.g., a cashier's check kiosk). The method may include generating, by the first computing device, a first dynamic QR code comprising a plurality of first QR code frames, wherein each first QR code frame of the plurality of first QR code frames is transmitted at a first frequency, and wherein the plurality of first QR code frames comprises one or more non-viable first QR code frames and at least one viable first QR code frame. The method may include displaying, by the first computing device, the first dynamic QR code, wherein the at least one viable first QR code frame is displayed at a first time. The method may include transmitting, by the first computing device, a first pulse (e.g., a wireless signal, infrared light, a strobe, etc.) to the first user device, wherein the first pulse notifies the first user device to capture the at least one viable first QR code frame. The method may include capturing, by the first user device at the first time and in response to receiving the first pulse, the at least one viable first QR code frame. The method may include authenticating, by the first user device, a first user of the first user device. The method may include receiving, at the first computing device and from the first user device, a request to complete a transaction. The method may include generating, in response to authenticating the first user of the first user device and by the first user device, a second dynamic QR code comprising a plurality of second QR code frames, wherein each second QR code frame of the plurality of second QR code frames is transmitted at a second frequency, and wherein the plurality of second QR code frames comprises one or more non-viable second QR code frames and at least one viable second QR code frame. The method may include displaying, by the first user device, the second dynamic QR code, wherein the at least one viable second QR code frame is displayed at a second time. The method may include transmitting, by the first user device, a second pulse to the first computing device, wherein the second pulse notifies the first computing device to capture the at least one viable second QR code frame. The method may include capturing, by the first computing device at the second time and in response to receiving the second pulse, the at least one viable second QR code frame. The method may include completing, by the first computing device, the transaction. This embodiment provides the added benefit of significantly reducing any potentially fraudulent activity by iteratively validating both the user device and the user associated with the user device prior to completing the requested transaction.

In another embodiment, a system may include one or more processors and a memory in communication with the one or more processors and storing instructions, that when executed by the one or more processors, are configured to cause the system to perform a method for validating customer interactions. The system may recognize a first user device. The system may generate a first dynamic QR code comprising a plurality of first QR code frames, wherein each first QR code frame of the plurality of first QR code frames is transmitted at a first frequency, and wherein the plurality of first QR code frames comprises one or more non-viable first QR code frames and at least one viable first QR code frame. The system may display the first dynamic QR code, wherein the at least one viable first QR code frame is displayed at a first time. The system may then transmit a first pulse to the first user device, wherein the first pulse notifies the first user device to capture the at least one viable first QR code frame at the first time. The system may receive, from the first user device, a request to complete a transaction. The system may capture, from the first user device, a second QR code. The system may then determine whether the second QR code is authenticated. Responsive to determining that the second QR code is authenticated, the system may complete the transaction.

In a further embodiment, a system may include one or more processors and a memory in communication with the one or more processors and storing instructions, that when executed by the one or more processors, are configured to cause the system to perform a method for validating customer interactions. The system may capture, from a first computing device, a first dynamic QR code. The system may transmit, to the first computing device, a request to complete a transaction. The system may generate a second dynamic QR code comprising a plurality of second QR code frames, wherein each second QR code frame of the plurality of second QR code frames is transmitted at a first frequency, and wherein the plurality of second QR code frames comprises one or more non-viable second QR code frames and at least one viable second QR code frame. The system may display the second dynamic QR code, wherein the at least one viable second QR code frame is displayed at a first time. The system may then cause the first computing device to complete the transaction by transmitting a first pulse to the first computing device, wherein the first pulse notifies the first computing device to capture the at least one viable second QR code frame at the first time.

According to other aspects of the disclosure, systems and methods are disclosed for securely generating and printing a document.

In one embodiment, a method for securely generating and printing a document may include receiving, by one or more processors of a computer system, information for the document from a computing device through a network, verifying the information for the document, and upon verification of the information for the document, generating document generation data using at least a portion of the information for the document, the document generation data including one or more of document metadata that enables generation of an image of the document or the image of the document. The method may also include, receiving, by the one or more processors, first authentication information of a first code associated with a printing device from the computing device through the network, receiving second authentication information of a second code associated with the computing device from the printing device through the network, and verifying the first authentication information of the first code and the second authentication information of the second code. The method may further include transmitting the document generation data to the printing device through the network upon verification of the first authentication information and the second authentication information, and causing the printing device to print the image of the document.

In another embodiment, a computer system for securely generating and printing a document may include a memory storing instructions and one or more processors configured to execute the instructions to perform operations. The operations may include receiving information for the document from a computing device through a network, verifying the information for the document, and upon verification of the information for the document, generating document generation data using at least a portion of the information for the document. The document generation data may include one or more of document metadata that enables generation of an image of the document or the image of the document. The operations may also include receiving authentication information of a first code associated with a printing device from the computing device through the network, receiving second authentication information of a second code associated with the computing device from the printing device through the network, and verifying the first authentication information of the first code and the second authentication information of the second code. The operations may further include upon verification of the first authentication information and the second authentication information, transmitting the document generation data to the printing device through the network, and causing the printing device to print the image of the document.

In a further embodiment, a method for securely generating and printing a document may include receiving, by one or more processors of a computer system, information for the document from a computing device through a network, verifying the information for the document includes a minimum or required amount of information, and upon verification of the information for the document, generating document generation data using at least a portion of the information for the document. The document generation data may include one or more of document metadata that enables generation of an image of the document or the image of the document. The method may also include receiving first authentication information of a first code associated with a printing device from the computing device through the network, wherein the first authentication information includes identifying information of the printing device, receiving second authentication information of a second code associated with the computing device from the printing device through the network, wherein the second authentication information includes identifying information of the computing device, and verifying the first authentication information of the first code and the second authentication information of the second code. The verifying may include comparing the identifying information of the printing device with stored identifying information of the printing device, comparing the identifying information of the computing device with stored identifying of the computing device, and based on the comparing, verifying the first authentication information and the second authentication information. The method may further include transmitting the document generation data to the printing device through the network upon verification of the first authentication information and the second authentication information, and causing the printing device to print the image of the document, wherein if the document generation data transmitted to the printing device only includes the document metadata, the printing device is further caused to generate the image of the document based on the document metadata.

It is to be understood that both the foregoing general description and the following detailed description are exemplary and explanatory only and are not restrictive of the disclosed embodiments, as claimed. Each of the examples disclosed herein may include one or more of the features described in connection with any of the other disclosed examples.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 3A-3B are a flowchart of a method for validating customer interactions, in accordance with some embodiments of the present disclosure;

FIGS. 7A-7L depict various display screens of an application displayed on a computing device of the system architecture of FIG. 6.

DETAILED DESCRIPTION OF EMBODIMENTS

Figure 1:
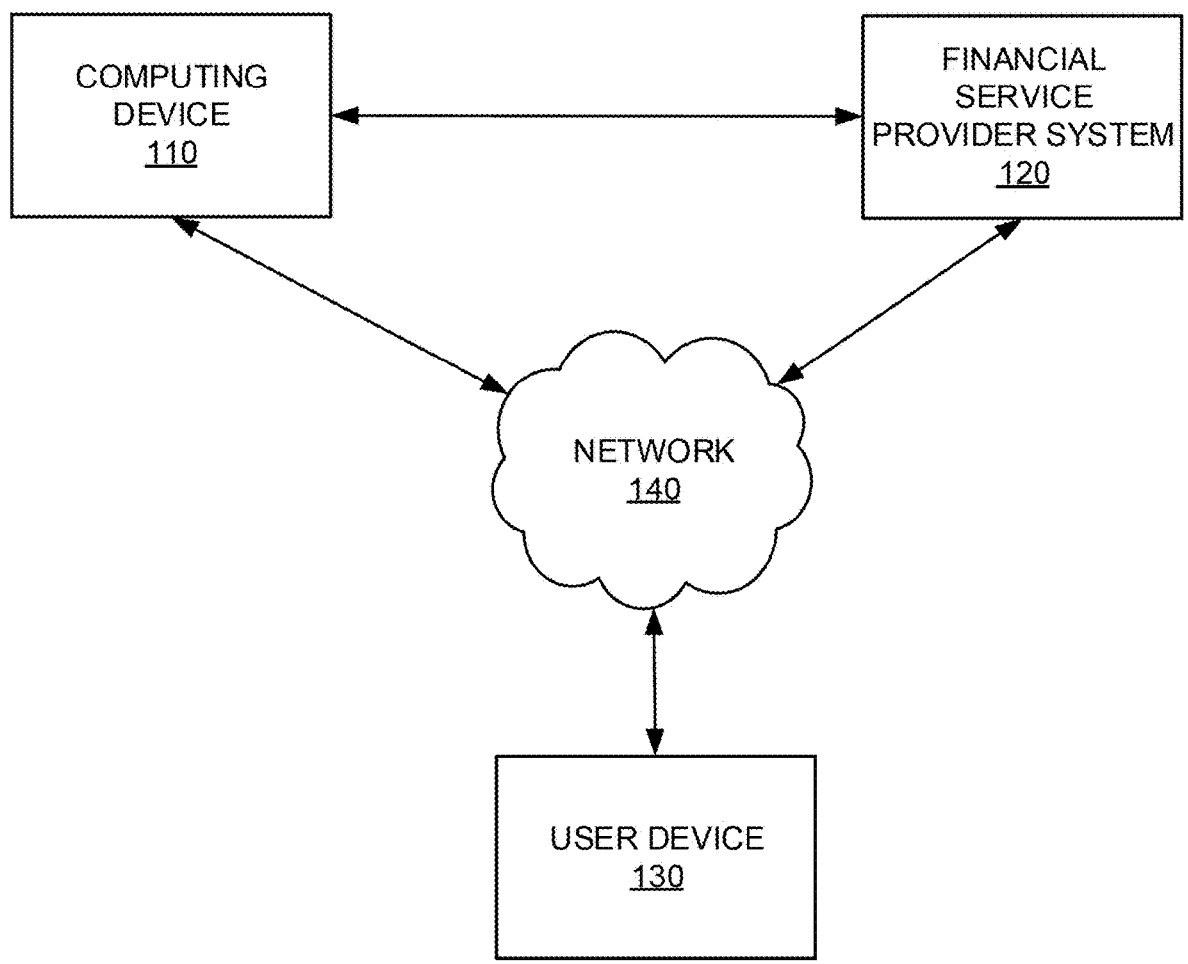
FIG. 1 is a block diagram of an example system environment that may be used to implement one or more embodiments of the present disclosure.

Various embodiments of the present disclosure relate generally to printing documents and, more particularly, to systems and methods for securely generating and printing a document.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "computer system" generally encompasses any device or combination of devices, each device having at least one processor that executes instructions from a memory medium. Additionally, a computer system may be included as a part of another computer system.

In this disclosure, the term "based on" means "based at least in part on." The singular forms "a," "an," and "the" include plural referents unless the context dictates otherwise. The term "exemplary" is used in the sense of "example" rather than "ideal." The term "or" is used disjunctively, such that "at least one of A or B" includes, only A; only B; plural A (e.g., A and A); plural B (e.g., B and B); one of each A and B (e.g., A and B); etc., such that it means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

By way of introduction, some aspects discussed herein may relate to systems and methods for validating customer interactions. For example, some embodiments describe using a dynamic QR code at a financial transaction kiosk and on an individual user device to iteratively validate interactions between the kiosk and the user associated with the user device. These provide advantages over other systems and methods by making it so unintended actors may not intercept financial transactions. As such, the following discussion describes several exemplary systems and methods for iteratively validating customer interactions using a dynamic QR code.

These exemplary systems and methods specifically provide improvements to the functioning of computing devices, such as kiosks, ATMs, and mobile devices, by significantly increasing the reliability of real-time, user-specific authentication. For example, a standalone financial kiosk, through generating and displaying a dynamic QR code with rapidly changing QR code frames while transmitting a pulse (described below) at a time that corresponds to when a correct QR code frame of the multiple QR code frames is displayed, may significantly reduce, if not eliminate, fraudulent activity occurring during certain types of transactions. The disclosed dynamic QR codes may be designed such that they require a user to not only capture the correct QR code frame at a precisely defined time, but also from a specific angle, and from a close enough distance to maintain a sufficient wireless connection between the kiosk and the user's mobile device.

For similar reasons, the following exemplary systems and methods also provide improvements to the networking and communication between personal computing devices and other computing devices. By securely and efficiently enabling users to connect and authenticate with another stationary computing device, such as a kiosk, users can verify they are present at a brick-and-mortar location allowing the users to conduct high value transactions via a low-risk process without the need for merchant or human intervention. This may result in decreased fraud and increased customer trust.

Other aspects discussed herein may relate to systems and methods for securely generating and printing a document. For example, the system may include a kiosk or similar device that communicates with a backend server. The kiosk may include a printer, a display screen for displaying codes (e.g., QR codes), a code scanner for scanning codes (e.g., QR codes), and a slot for dispensing a printed document from the printer and out of the kiosk. A user may use a mobile or similar application on a computing device (e.g., a mobile device) to input information for the document and send the information to the backend server. When the server has received and verified the information, the server may generate document generation data from at least a portion of the verified information, the document generation data including document metadata for generating an image of the document and/or the image of the document. The application may then display a code (e.g., QR code) to be scanned. The user may take the mobile device to the kiosk, scan the code on the application with a scanner of the kiosk, and scan an additional code on the display of the kiosk with the mobile device. When both codes have been scanned and verified, the server may transmit the document generation data to the kiosk and may cause the kiosk to generate an image of the document (e.g., if the image is not included in the document generation data) and/or print the image of the document. The printer of the kiosk may include specialized ink or toner for printing certain types of documents. For example, the printer may include magnetic toner for printing cashier's checks.

The kiosk may also including a dispensing device that can be attached to the printer. The dispensing device can grab or contact the printed document and dispense (e.g., urge) the printed document out of the slot of the kiosk. If the user does not take the printed document within a predetermined amount of time or upon the determination of other criteria, the dispensing device may pull (e.g., retrieve) the document back into the kiosk, and an operator may open the kiosk and dispose of the document.

The kiosk and the mobile device may each individually communicate with the server. Accordingly, for added security, the kiosk and the mobile device do not communicate with each other directly. Further, the information for the document is not sent to, or stored at, the kiosk. If a user attempts to access the kiosk in an unauthorized manner, the kiosk may automatically shut down and the operator may be notified. Accordingly, these features may help to reduce or prevent information from being stolen. Thus, per the above, the methods and systems described herein may more securely generate and print documents as compared to conventional printing techniques.

FIGS. 1-5 depict example systems and methods for iteratively validating customer interactions using a dynamic QR code. FIG. 1 is a diagram of an example system environment that may be used to implement one or more embodiments of the present disclosure. The components and arrangements shown in FIG. 1 are not intended to limit the disclosed embodiments as the components used to implement the disclosed processes and features may vary.

In accordance with disclosed embodiments, system 100 may include a computing device 110 (as will be discussed in more detail below with reference to FIG. 2) that may be in communication (either directly or via a network 140) with a financial service provider system 120. System 100 may also include a user device 130 that may be in communication (either directly or via network 140) with each other, financial service provider system 120, and/or computing device 110.

In certain embodiments, financial service provider system 120 may store and/or have access to detailed customer information, such as account information. Financial service provider system 120 may communicate with computing device 110 to correlate compiled data, analyze the compiled data, arrange the compiled data, generate derived data based on the compiled data, and store the compiled and derived data in a database. Financial service provider system 120 may also communicate with computing device 110 and/or user device 130 to provide one or more graphical user interface (GUI) displays to enable a user to input data, search for data, transfer data, and transmit and receive payments.

User device 130 may be a mobile computing device (e.g., a smart phone, tablet computer, smart wearable device, portable laptop computer, voice command device, wearable augmented reality device, or other mobile computing device), a stationary device (e.g., desktop computer), or any other device capable of communicating with network 140 and ultimately communicating with one or more components of system 100. In some embodiments, user device 130 may include or incorporate electronic communication devices for hearing or vision impaired users. User device 130 may be operated by a user, which may include individuals such as, for example, subscribers, clients, prospective clients, or customers of an entity associated with an organization, such as individuals who have obtained, will obtain, or may obtain a product, service, or consultation from an entity associated with system 100. According to some embodiments, user device 130 may include an environmental sensor for obtaining audio or visual data, such as a microphone and/or digital camera, a geographic location sensor for determining the location of the device, an input/output ("I/O") device such as a transceiver for sending and receiving data, a display for displaying digital images, one or more processors including a sentiment depiction processor, and a memory in communication with the one or more processors.

Network 140 may be of any suitable type, including individual connections via the internet such as cellular or WiFi™ networks. In some embodiments, network 140 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
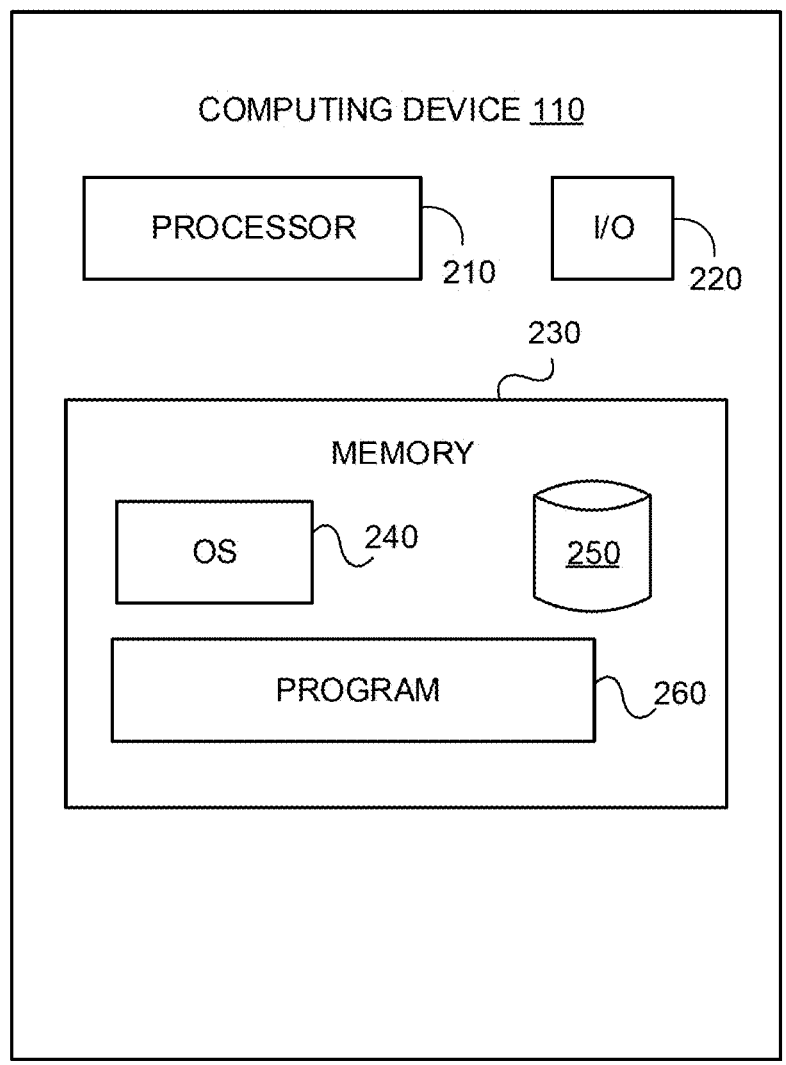
FIG. 2 is a component diagram of a computing device in accordance with some embodiments of the present disclosure.

An example embodiment of computing device 110 is shown in more detail in FIG. 2. As shown, computing device 110 may include a processor 210, an I/O device 220, a memory 230 containing an operating system ("OS") 240, a database 250, and a program 260.

Computing device 110 may be a single server or may be configured as a distributed computer system including multiple servers or computers that interoperate to perform one or more of the processes and functionalities associated with the disclosed embodiments. In some embodiments, computing device 110 may further include a peripheral interface, a transceiver, a mobile network interface in communication with processor 210, a bus configured to facilitate communication between the various components of computing device 110, and a power source configured to power one or more components of computing device 110. A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, an NFC port, another like communication interface, or any combination thereof.

In some embodiments, a transceiver may be configured to communicate with compatible devices and ID tags when they are within a predetermined range. A transceiver may be compatible with one or more of: RFID, NFC, Bluetooth™, low-energy Bluetooth™ (BLE), WiFi™, ZigBee™, ABC protocols or similar technologies.

A mobile network interface may provide access to a cellular network, the Internet, or another wide-area network. In some embodiments, a mobile network interface may include hardware, firmware, and/or software that allows processor 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files, including an operating system, application programs (including, e.g., a web browser application, a widget or gadget engine, or other applications, as necessary), executable instructions, and data. In one embodiment, the processing techniques described herein are implemented as a combination of executable instructions and data within memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Computing device 110 may include one or more storage devices configured to store information used by processor 210 (or other components) to perform certain functions related to the disclosed embodiments. In one example, computing device 110 may include memory 230 that includes instructions to enable processor 210 to execute one or more applications, such as server applications, network communication processes, and any other type of application or software known to be available on computer systems. Alternatively, the instructions, application programs, etc., may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, computing device 110 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, computing device 110 may include memory 230 that may include one or more programs 260 to perform one or more functions of the disclosed embodiments. Moreover, processor 210 may execute one or more programs 260 located remotely from computing device 110. For example, computing device 110 may access one or more remote programs 260, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include database 250 for storing related data to enable computing device 110 to perform one or more of the processes and functionalities associated with the disclosed embodiments.

Computing device 110 may also be communicatively connected to one or more memory devices (e.g., databases (not shown)) locally or through a network. The remote memory devices may be configured to store information and may be accessed and/or managed by computing device 110. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Computing device 110 may also include one or more I/O devices 220 that may include one or more interfaces for receiving signals or input from devices and providing signals or output to one or more devices that allow data to be received and/or transmitted by computing device 110. For example, computing device 110 may include interface components, which may provide interfaces to one or more input devices, such as one or more keyboards, mouse devices, touch screens, track pads, trackballs, scroll wheels, digital cameras, microphones, sensors, and the like, that enable computing device 110 to receive data from one or more users (such as via user device 130).

In example embodiments of the disclosed technology, computing device 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While computing device 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations may include a greater or lesser number of components than those illustrated.

FIGS. 3A-3B show a flowchart of a method 300 for validating customer interactions. Method 300 may be performed by computing device 110, financial service provider system 120, and/or user device 130.

Starting with FIG. 3A, in block 302, the system (e.g., system 100) may establish a wireless connection (e.g., via network 140) between a first user device (e.g., user device 130) and a first computing device (e.g., computing device 110). For example, the first user device and the first computing device may both be connected to a wireless connection associated with a merchant while in a merchant premises. Establishing a wireless connection between the first user device and the first computing device may not only allow for initiation of the first computing device (e.g., "waking up" a stationary kiosk located within a merchant premises), but may also allow the first user device and first computing device to maintain a sufficient enough connection throughout a transaction such that authentication of a user of the first user device may be maintained. As the strength of the wireless connection may weaken the farther the first user device is away from the first computing device, any unintended actors (e.g., persons standing across the room from the kiosk in the merchant premises) may have difficulty maintaining a sufficient enough connection to conduct any type of fraudulent activity associated with a given transaction.

In block 304, the system (e.g., system 100) may generate, by the first computing device, a first dynamic QR code comprising a plurality of first QR code frames, wherein each first QR code frame of the plurality of first QR code frames is transmitted at a first frequency, and wherein the plurality of first QR code frames comprises one or more non-viable first QR code frames and at least one viable first QR code frame. The first dynamic QR code may be generated in any color and may comprise any square number of individual blocks. For example, the first dynamic QR code may be generated in the shape of a square comprising, e.g., 100×100 individual small blocks. The greater the number of individual small blocks comprising the first dynamic QR code, the more difficult it would be for an unintended actor (e.g., someone standing in line behind a customer at a kiosk) to replicate the first dynamic QR code.

The first dynamic QR code may comprise, for example, account information, local data, temporary data, etc. That is, the first computing device, e.g., a kiosk, may be configured to generate the first dynamic QR code by compiling account information associated with a user, locally stored data, and/or cloud-based data. Each first QR code frame of the plurality of first QR code frames that make up the first dynamic QR code may comprise a different assortment of such compiled data. This feature provides the benefit of creating user- and/or transaction-specific dynamic QR codes, once again making those QR codes difficult to recreate.

The first frequency may be any preset time interval by which each first QR code frame changes. For example, the first frequency may be set such that a new first QR code frame is displayed every one hundred milliseconds. The first dynamic QR code may be configured such that the plurality of first QR code frames comprising the first dynamic QR code is set on a loop. For example, if a first dynamic QR code is configured based on a total transmission length of 1200 milliseconds, at 1200 milliseconds the final first QR code frame may change back to the first QR code frame initially displayed. Each first QR code frame may comprise one or more different QR sense points in comparison to its immediately preceding first QR code frame. That is, the distance and/or angle ideal for capturing each first QR code frame (as discussed further below with respect to block 310), may be slightly different for each first QR code frame. This feature provides the added benefit of allowing an intended user standing right in front of the first dynamic QR code, to easily capture each first QR code frame; however, any unintended actor attempting to capture the first dynamic QR code from a different angle and/or distance away, would likely not be able to capture the full series of first QR code frames, thereby reducing the unintended actor's chances of capturing the at least one viable first QR code frame, as discussed further below.

The one or more non-viable (or dummy) first QR code frames included in the plurality of first QR code frames are those first QR code frames that are non-functional, i.e., will not successfully authenticate a first user of the first user device, as described further below with respect to block 312. In some embodiments, the system may be configured to track each non-viable first QR code frame that someone attempts to use such that the system, e.g., owed and/or operated by an organization, can track potentially fraudulent activity. The at least one viable first QR code frame included in the plurality of first QR code frames, however, is the only first QR code frame that will successfully authenticate the first user. As discussed above, this feature provides the added benefit of significantly reducing fraudulent transaction activity as an unintended actor would have an impracticable chance of being able to capture the viable first QR code frame out of the plurality of first QR code frames (changing at such a high first frequency), as further described below with respect to block 310.

In block 306, the system (e.g., system 100) may display, by the first computing device, the first dynamic QR code, wherein the at least one viable first QR code frame is displayed at a first time (e.g., 600-700 milliseconds after initially displaying the first frame). In some embodiments, the first computing device may display the first dynamic QR code via a GUI display, for example, on the front of an ATM or kiosk. As discussed above, as each of the first QR code frames of the plurality of first QR code frames changes, the at least one viable first QR code frame may be displayed at a specific moment in time.

In block 308, the system (e.g., system 100) may transmit, by the first computing device, a first pulse to the first user device, wherein the first pulse notifies the first user device to capture the at least one viable first QR code frame. The first pulse may comprise, for example, a wireless connection signal such as a medium-range radio waive wireless signal utilizing 2.4, 5, and/or 6 GHZ (e.g., WiFi™ signal), a short-range radio wave wireless signal utilizing 2.4 Gigahertz (GHz) radio frequencies (e.g., a Bluetooth™ signal or a Bluetooth LE™ signal), or an NFC signal, infrared light, a strobe, an audible signal, and/or a non-audible signal (e.g., frequencies below 20 Hz (infrasonic sound) and above 20 kHz (ultrasonic sound)). That is, the first computing device may emit the first pulse to alert the first user device that it should capture the at least one viable first QR code frame, e.g., via an image and/or sound capturing device of the first user device.

In block 310, the system (e.g., system 100) may capture, by the first user device at the first time and in response to receiving the first pulse, the at least one viable first QR code frame. That is, as discussed above, the first user device may, depending on the form of pulse, use its image and/or sound capturing device to capture the at least one viable first QR code at the precise moment in time it is displayed by the first computing device. In some embodiments, the first user device may capture each first QR code frame, including any non-viable frames, as they move through their timed loop, as described above. The first user device may be configured to then, in response to receiving the first pulse, capture the viable first QR code frame and remove the captured non-viable frames from, e.g., any internal memory device. Alternatively, the first user device may identify the viable first QR code frame from all captured first QR code frames based on the time the first user device receives or recognized the first pulse. Put another way, the first user device may identify the viable first QR code frame by finding the QR code that was captured at the same time as the first pulse.

In block 312, the system (e.g., system 100) may authenticate, by the first user device, a first user of the first user device. In some embodiments, authenticating may comprise prompting a first user to log into a mobile application by, for example, entering a username and/or password. Once the first user has logged into the mobile application, the first user may then be further prompted to enter additional identification information (e.g., name, phone number, email address, account information, etc.) such that the system may further authenticate the first user to ensure the first user is correctly associated with the first user device.

Turning to FIG. 3B, in block 314, the system (e.g., system 100) may receive, at the first computing device and from the first user device, a request to complete a transaction. The request may comprise, for example, a transaction type (e.g., obtaining a cashier's check, withdrawing funds, depositing a check, etc.), one or more accounts, a payee, a transaction amount, etc. In some embodiments, the first user may enter the request and any associated information via a GUI of the first user device and may then send the request via the first user device to the first computing device. For example, as discussed above, the first user may already have logged into a mobile application via the first user's mobile device. Within the mobile application, the first user may request the first computing device (e.g. a kiosk) generate a cashier's check for a certain dollar amount.

In block 316, responsive to authenticating the first user of the first user device, the system (e.g., system 100) may generate, by the first user device, a second dynamic QR code comprising a plurality of second QR code frames, wherein each second QR code frame of the plurality of second QR code frames is transmitted at a second frequency, and wherein the plurality of second QR code frames comprises one or more non-viable second QR code frames and at least one viable second QR code frame. The second dynamic QR code may be similar to the first dynamic QR code, as discussed above with respect to block 304, except that the second dynamic QR code is being generated by the first user device instead of the first computing device. For example, once the first user has been authenticated by the system, as discussed above, the first user device may generate its own second dynamic QR code for display on a GUI of the first user device. In some embodiments, the system may instead generate, by the first user device, a static QR code, i.e., one that contains only a single, fixed QR code frame.

In block 318, the system (e.g., system 100) may display, by the first user device, the second dynamic QR code, wherein the at least one viable second QR code frame is displayed at a second time. Displaying the second dynamic QR code may be similar to displaying the first dynamic QR code, as discussed above with respect to block 306, except that the second dynamic QR code is displayed by the first user device instead of the first computing device. For example, the first user device may display the second dynamic QR code via a GUI display of the first user device.

In block 320, the system (e.g., system 100) may transmit, by the first user device, a second pulse to the first computing device, wherein the second pulse notifies the first computing device to capture the at least one viable second QR code frame. Transmitting the second pulse may be similar to transmitting the first pulse, as discussed above with respect to block 308, except that the second pulse is being transmitted by the first user device instead of the first computing device. That is, the first user device may emit the second pulse to alert the first computing device that it should capture the at least one viable second QR code frame, e.g. via an image and/or sound capturing device of the first computing device.

In block 322, the system (e.g., system 100) may capture, by the first computing device at the second time and in response to receiving the second pulse, the at least one viable second QR code frame. Capturing the at least one viable second QR code frame is similar to capturing the at least one viable first QR code frame, as discussed above with respect to block 310, except that the second viable QR code frame is being captured by the first computing device instead of the first user device.

In block 324, the system (e.g., system 100) may, by the first computing device, complete the transaction. For example, the first computing device may generate and issue a cashier's check, may complete a cash deposit, may deposit a check, etc. In the case of generating and issuing a cashier's check, the first computing device may produce the cashier's check (e.g., via a slot on the front of the first computing device) and provide the first user a predetermined amount of time to retrieve the cashier's check. Once the predetermined amount of time has expired, if the first user has not retrieved the cashier's check, the first computing device may retract the cashier's check. This feature provides an added security benefit of helping to ensure an unintended actor does not retrieve the first user's cashier check. In some embodiments, the first computing device may print the cashier's check with a QR code printed on the back of the cashier's check. Once the first user retrieves the cashier's check, the first user may then scan the QR code using an image capturing device of the first computing device (e.g., a QR code scanner). This feature provides an added step of validating that the first user did in fact retrieve the cashier's check.

Figure 4:
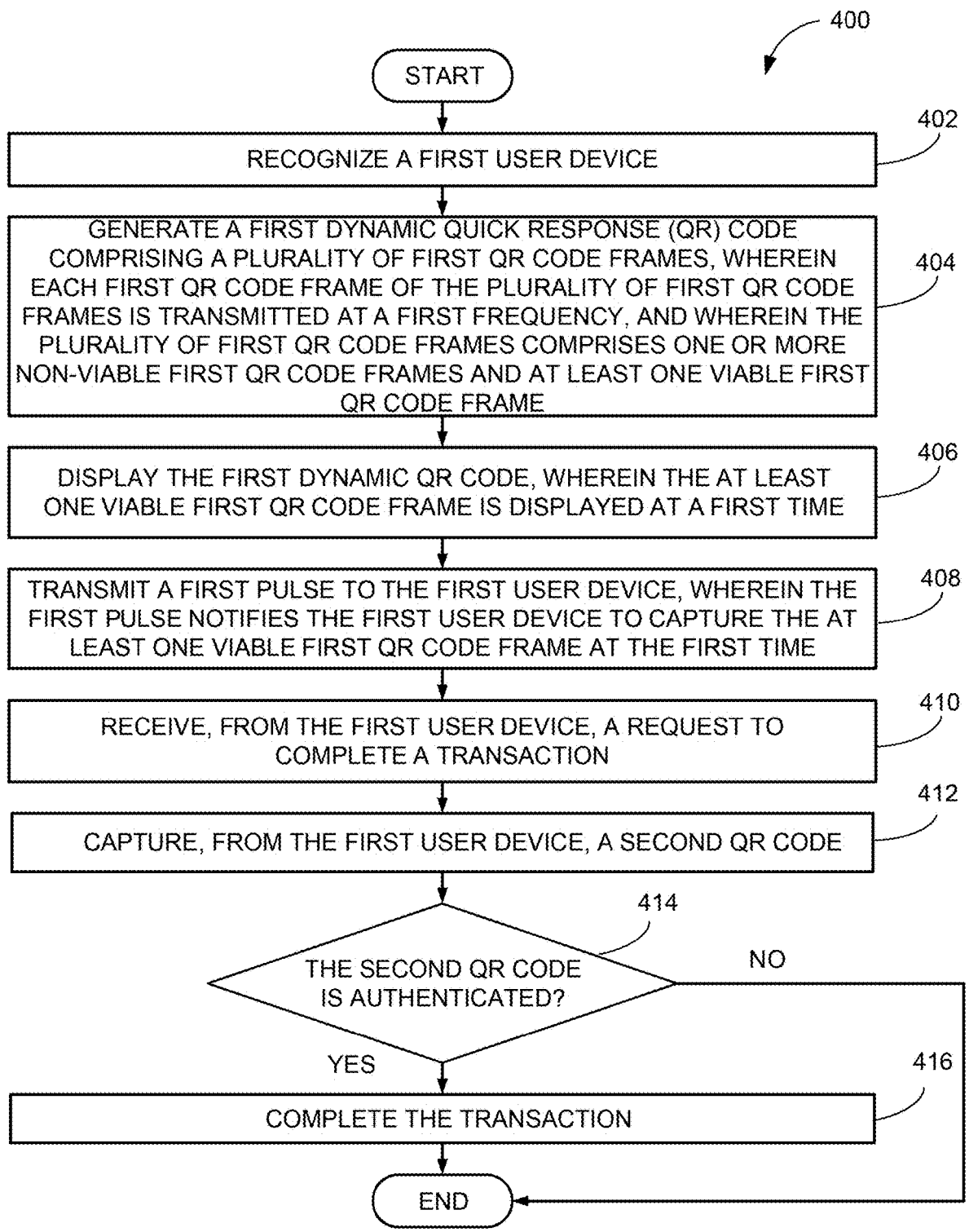
FIG. 4 is a flowchart of a method for validating customer interactions, in accordance with some embodiments of the present disclosure.

FIG. 4 shows a flowchart of a method 400 for validating customer interactions. Method 400 may also be performed by computing device 110, financial service provider system 120, and/or user device 130. Method 400 is similar to method 300 of FIGS. 3A-3B except that method 400 also includes blocks 402, 412, and 414. The descriptions of blocks 404, 406, 408, 410, and 416 are the same or similar to the respective descriptions of blocks 304, 306, 308, 314, and 324 of method 300, and as such, are not repeated herein for brevity.

In block 402 of FIG. 4, the system (e.g., system 100) may recognize a first user device. That is, the system may, in response to coming in close vicinity to the first user device, wake up or initiate. This recognition may be due to a wireless connection being established between the system and the first user device, as discussed above with respect to block 302. For example, a first user of the first user device (e.g., a mobile phone) may enter a merchant premises housing the system (e.g., a kiosk). The first user may connect the first user device to a wireless connection associated with the merchant, and to which the system is already connected.

In block 412 of FIG. 4, the system (e.g., system 100) may capture, from the first user device, a second QR code. As discussed above with respect to block 316, the second QR code, displayed by the first user device, may be either a dynamic or static QR code. Thus, the system may be configured to capture the second (dynamic) QR code as discussed above with respect to block 322, or to capture the second (static) QR code via an image (and/or audio) capturing device (e.g., a scanner).

In block 414 of FIG. 4, the system (e.g., system 100) may determine whether the second QR code is authenticated. As discussed above with respect to block 312, a first user associated with the first user device may have already authenticated him or herself by, for example, logging into a mobile application. As discussed above with respect to block 316, the second QR code may have then been generated by the first user device in response to authenticating the first user. The system may thus be configured to recognize that these prior authentication steps have occurred to ensure the second QR code is in fact also authenticated. This feature provides the added benefit of ensuring an unintended actor cannot simply create a random QR code that should not be associated with the first user or the requested transaction.

Figure 5:
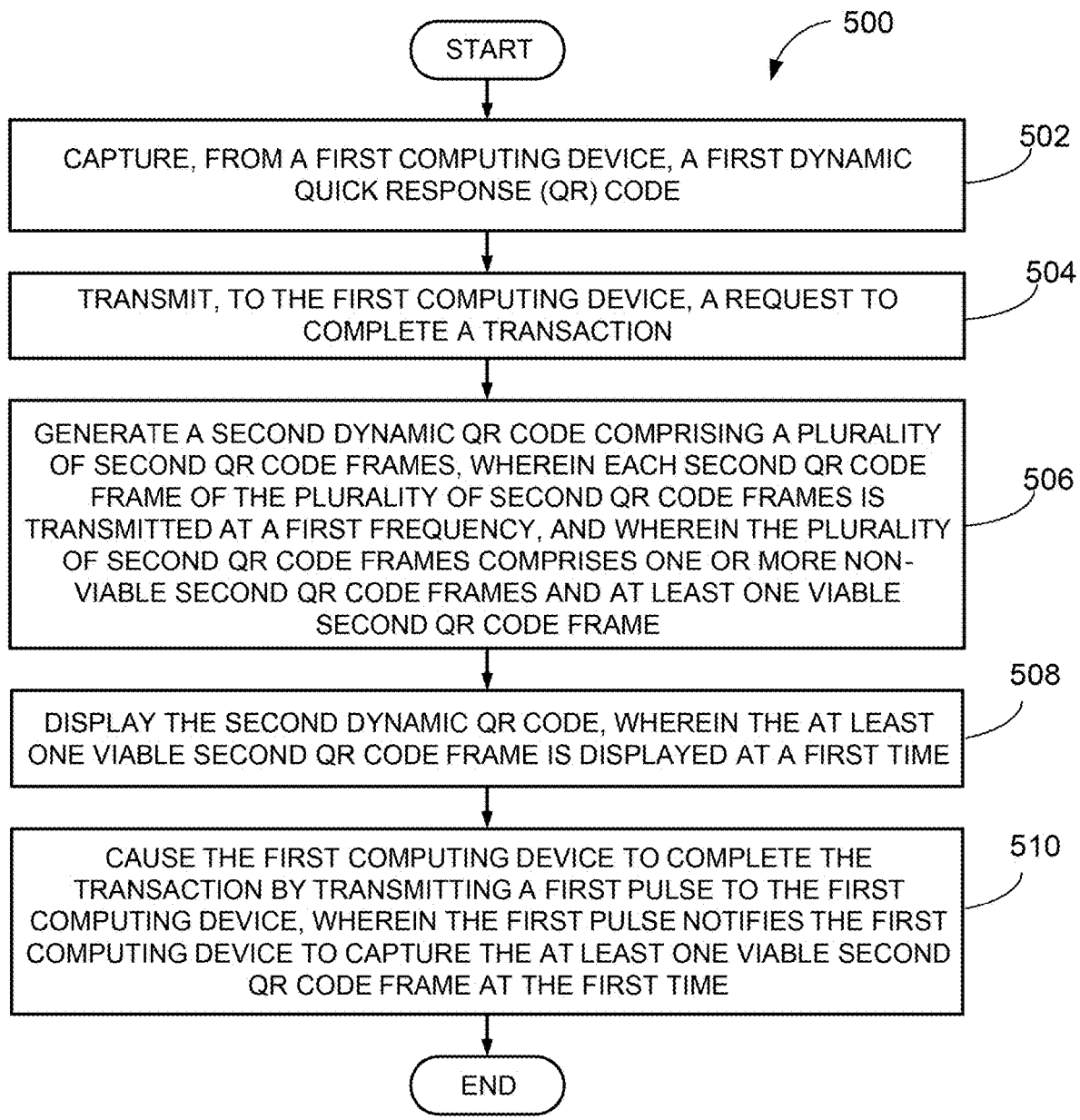
FIG. 5 is a flowchart of a method for validating customer interactions, in accordance with some embodiments of the present disclosure.

FIG. 5 shows a flowchart of a method 500 for validating customer interactions. Method 500 may also be performed by computing device 110, financial service provider system 120, and/or user device 130. Method 500 is similar to method 300 of FIGS. 3A-3B. The description of blocks 502, 504, 506, and 508 of method 500 are the same as or similar to the respective descriptions of blocks 310, 314, 316, and 318 of method 300, and as such, are not repeated herein for brevity. Further, the description of block 510 of method 500 is the same as or similar to the combined descriptions of blocks 320, 322, and 324 of method 300, and as such, are not repeated herein for brevity.

Example Use Case

The following example use case describes an example of a typical user flow pattern. It is intended solely for explanatory purposes and not in limitation.

In one example, a user holding a mobile device may walk into a merchant premises to obtain a cashier's check from a kiosk. As the user walks up to the kiosk, a wireless connection may be established between the mobile device and the kiosk. The kiosk, recognizing the presence of the mobile device, may then generate and display a first dynamic QR code. The first dynamic QR code may comprise a plurality of first QR code frames, wherein at least one of the first QR code frames is a viable frame (i.e., the only frame that will work to complete the transaction) while the remaining first QR code frames are non-viable. Each first QR code frame (including both the viable and non-viable frames) may be changing every one hundred milliseconds, such that the user cannot tell the first dynamic QR code is changing. The user may hold the mobile device up to the kiosk to capture the first dynamic QR code with the mobile device's camera. At some moment in time, the kiosk may transmit a pulse of infrared light to alert the mobile device to capture the viable QR code frame at that time. Other people standing inside the merchant premises would likely not be able to capture the viable QR code frame as they would be standing at varying distances and angles from the kiosk, thereby reducing the strength of the sense points contained within the first dynamic QR code. Further, their chances of capturing the viable QR code frame at the required precise moment in time as the user's mobile device recognizes the transmitted pulse would be extremely low.

Once the mobile device captures the viable QR code frame, the mobile device may prompt the user to log into a mobile banking application by entering his or her username and password. Once logged into the mobile banking application, the application may also prompt the user to complete multi-step authentication by entering additional personal or contact information, such as the user's mobile number and/or address. The user may then request the kiosk generate a cashier's check by entering, into the mobile banking application, the requested amount, the payee, and the account from which to pull the funds. The mobile device may then generate and display, via a GUI of the mobile device, a second dynamic QR code that is configured like the first dynamic QR code previously generated and displayed by the kiosk. That is, the second dynamic QR code may comprise a plurality of second QR code frames, wherein at least one of the second QR code frames is a viable frame while the remaining second QR code frames are non-viable, and each second QR code frame is changing every one hundred milliseconds. Once the user sees the second dynamic QR code displayed on the mobile device display, the user may hold the mobile device up to a scanner on the kiosk such that the kiosk may capture the second dynamic QR code. The mobile device may then, at some moment in time, transmit a pulse of infrared light to alert the kiosk to capture the viable QR code frame. Once the kiosk captures the viable QR code frame, the kiosk may then generate the cashier's check. The user may retrieve the cashier's check from a slot on the front of the kiosk. Finally, the user may use the kiosk scanner to scan a QR code printed on the back of the cashier's check, such that the kiosk may confirm the user has the cashier's check in hand.

FIGS. 6-10 depict example systems and methods for securely generating and printing a document. The document may be any type of document or instrument promising or guaranteeing the payment of a specific amount of money to a given individual or entity by an issuer of the document. One example document may be a cashier's check generated by a kiosk or other similar document printing device, as described in the above-provided example use case. Other example documents may include, but are not limited to, a personal check, a traveler's check, or money orders, or other secure documents.

Figure 6:
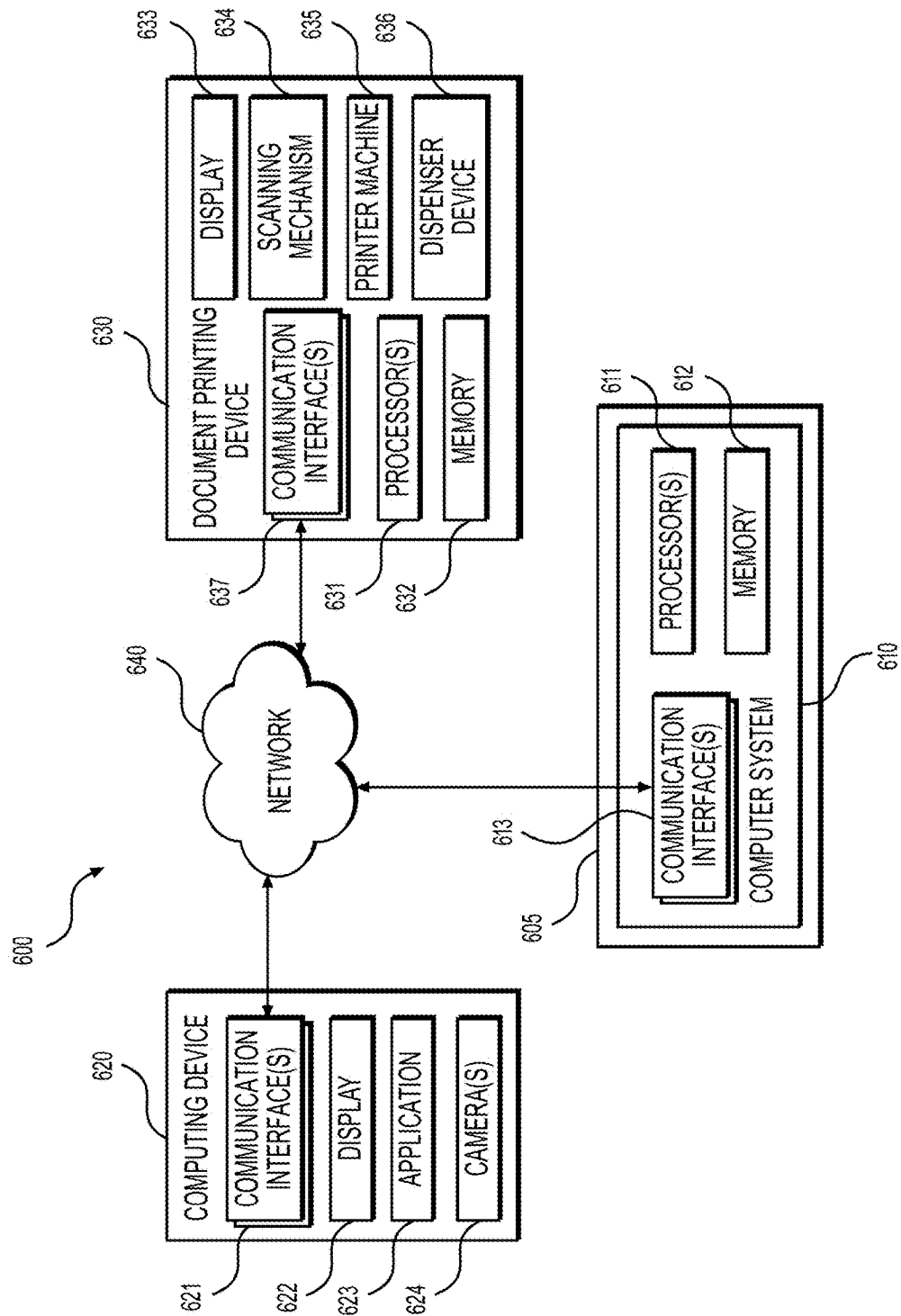
FIG. 6 depicts an exemplary system architecture for securely generating and printing a document, in accordance with some embodiments of the present disclosure.

FIG. 6 is a diagram depicting an exemplary system environment 600 for securely generating and printing a document, according to embodiments of the present disclosure. As shown in FIG. 6, system environment 600 may include a computer system 610, a user computing device (or a device associated with a user) 620, a document printing device 630, and a network 640. These components of system environment 600 may include similar components to the system 100 described in FIG. 1. For example, computer system 610 may be an example of the financial service provider system 120 described in FIG. 1. User computing device 620 may be an example of the user device 130 described in FIG. 1. Document printing device 630 may be an example of the computing device 110 described in FIG. 1. Network 640 may be a same or similar network to network 140 described in FIG. 1. Computer system 610 and user computing device 620, and computer system 610 and document printing device 630, may be in communication with each other via network 640, as detailed below.

Figure 10:
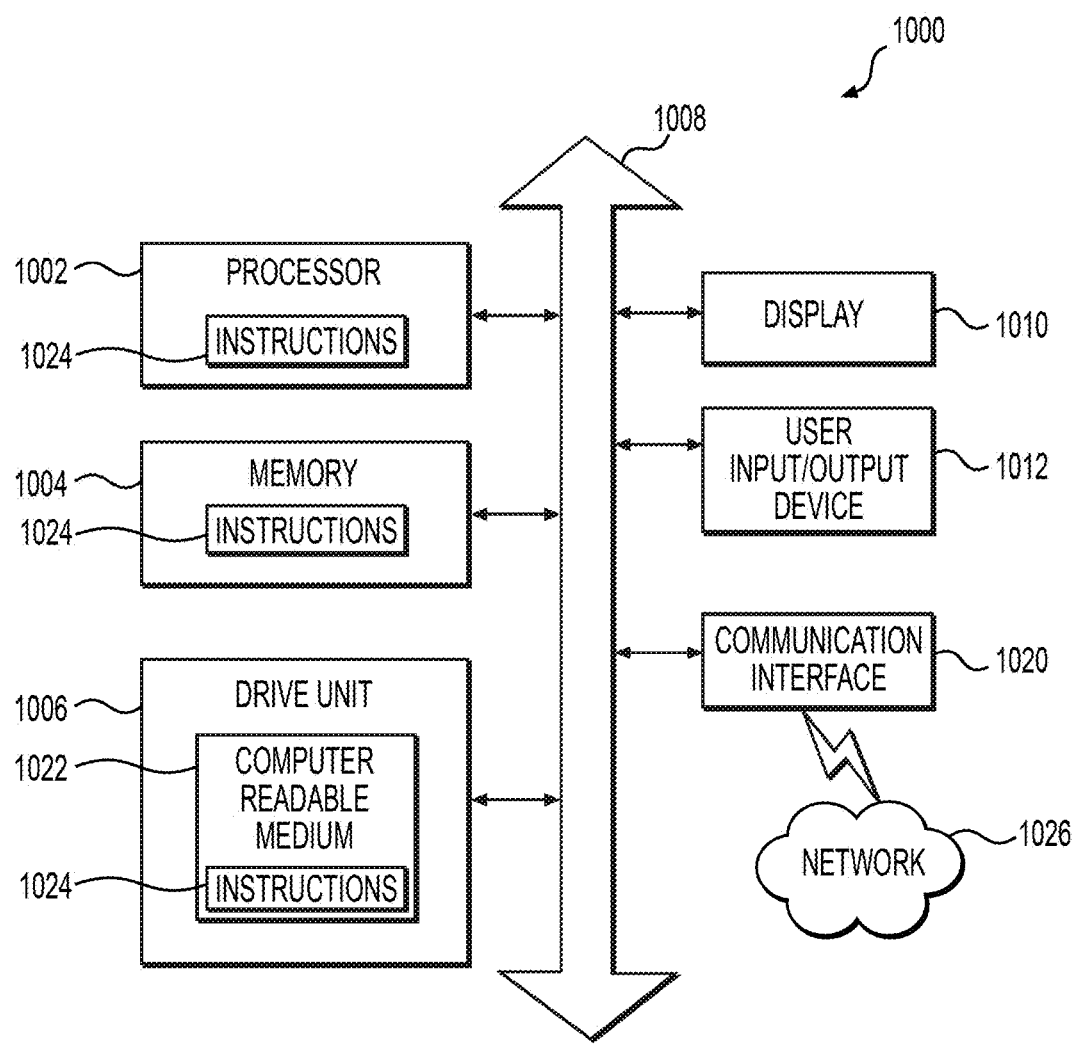
FIG. 10 depicts an example system that may execute techniques presented herein.

The computer system 610 may include computing systems, such as computer 1000 described with respect to FIG. 10. As such, computer system 610 may include one or more processors 611 and a memory 612 for storing and executing applications or software modules of system environment 600. For example, computer system 610 may include one or more software modules to communicate with user devices and/or other computing devices through network 640, such as the Internet. Further, the one or more processors 611 may be configured to access the memory 612 and execute processor-readable instructions, which when executed by the processors 611 configures the processors 611 to perform a plurality of functions of the system environment 600. For example, the one or more processors 611 may include one or more processors 611 for generating and printing a document, as detailed further below.

Computer system 610 may include one or more communication interfaces 613. Communication interface 613 may include one or more cellular radios, Bluetooth, WiFi, near-field communication radios, or other appropriate communication devices for transmitting and receiving information. As can be seen in FIG. 6, communication interface 613 facilitates communication between computer system 610 and network 640. Multiple communication interfaces 613 may be included in computer system 610 for providing multiple forms of communication between computer system 610 and computing device 620 and/or document printing device 630 via network 640. For example, communication may be achieved with network 640 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

Computer system 610 may be configured to receive data from other components (e.g., user computing device 620 and/or document printing device 630) of system environment 600 via network 640. Computer system 610 may further be configured to utilize the received data by inputting the received data into an algorithm to produce a result (e.g., generate document generation data, such as document metadata and/or an image of a document, as detailed below). Information indicating the result may be transmitted to user computing device 620 and/or the document printing device 630 over network 640. In some embodiments, the computer system 610 may be referred to as a server system that provides a service including providing the information indicating the received data and/or the result to the user computing device 620 and/or the document printing device 630. Computer system 610 may be part of an entity 605, which may include any type of company, organization, or institution that implements one or more applications. In some examples, entity 605 may be a financial service provider (e.g., associated with the financial service provider system 120 described in FIG. 1).

Computer system 610 may implement one or more applications of entity 605. The one or more applications may be downloaded, installed, and executed by user computing device 620, and may include applications for securely generating and printing a document, as detailed below.

Network 640 may be any suitable network or combination of networks and may support any appropriate protocol suitable for communication of data to and from the computer system 610 and between various other components in the system environment 600 (e.g., user computing device 620 and/or document printing device 630). Network 640 may include a public network (e.g., the Internet), a private network (e.g., a network within an organization), or a combination of public and/or private networks. Network 640 may be configured to provide communication between various components depicted in FIG. 6. Network 640 may comprise one or more networks that connect devices and/or components in the network layout to allow communication between the devices and/or components. For example, the network may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 640 may be implemented using cell and/or pager networks, satellite, licensed radio, or a combination of licensed and unlicensed radio.

Computing device 620 may be in communication with computer system 610 via network 640. Computing device 620 may be a computer system that is operated by a user, such as a mobile device (e.g., smartphone, tablet, pager, personal digital assistant (PDA)), a computer (e.g., laptop computer, desktop computer, server), or a wearable device (e.g., smart watch). Computing device 620 can also include any other media content player, for example, a set-top box, a television set, a video game system, or any electronic device capable of providing or rendering data. Computing device 620 may optionally be portable and/or may be handheld. Computing device 620 may include a memory, one or more processors, communication interfaces, input devices, and output devices, as detailed further below with reference to FIG. 10. It is understood that computing device 620 may include one or more computing devices accessed by one or more users. For example, a first user may use a first computing device 620 and a second user may use a second computing device 620.

Computing device 620 may include one or more communication interfaces 621. Communication interface 621 may include one or more cellular radios, Bluetooth, WiFi, near-field communication radios, or other appropriate communication devices for transmitting and receiving information. As can be seen in FIG. 6, communication interface 621 facilitates communication between user computing device 620 and network 640. Multiple communication interfaces 621 may be included in user computing device 620 for providing multiple forms of communication between user computing device 620 and computer system 610 via network 640. For example, communication may be achieved with network 640 through wireless communication (e.g., WiFi, radio communication, NFC, Bluetooth, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

Computing device 620 may also include a display 622, an application 623, and one or more cameras 624. The display 622 may include any type of display for displaying information of system environment 600. For example, display 622 may display a code (e.g., a QR code), a printing status, an instruction, an error message, or any other type of display or graphical user interface of system environment 600, as detailed further below.

Computing device 620 may operate the application 623 (e.g., a client program), also referred to as a user application or third-party application, used to communicate with the computer system 610. This user application 623 may be used to provide information (e.g., information for the document) to the computer system 610 and to receive information from the computer system 610. User application 623 may include a web-based application accessed through a web browser of user computing device 620 via network 640. In some examples, the user application 623 may be a mobile application or other application that is run on computing device 620.

Computing device 620 may also include one or more cameras 624 or similar devices. The one or more cameras 624 may scan code data and/or otherwise capture an image of the code data, as detailed further below. The code data may include a scannable code, such as a quick response (QR) code, a data matrix, a barcode, or any other type of scannable code. It is understood that the one or more cameras 624 may include any type of camera device and/or other type of scanning or image capturing device. Computing device 620 may also include other components, such as a positioning receiver (e.g., GPS device), processors, memory, and/or any other components for a computing device, such as those described below with reference to FIG. 10.

Document printing device 630 may include computing systems, such as computer 1000 described with respect to FIG. 10. As such, document printing device 630 may include one or more processors 631 and a memory 632 for storing and executing applications or software modules of document printing device 630. For example, document printing device 630 may include one or more software modules to communicate with user devices and/or other computing devices through network 640, such as the Internet. Further, the one or more processors 631 may be configured to access the memory 632 and execute processor-readable instructions, which when executed by the processors 631 configures the processors 631 to perform a plurality of functions of the system environment 600. For example, the one or more processors 631 may include one or more processors 631 for generating and/or printing a document (or an image thereof), as detailed further below.

Figure 9:
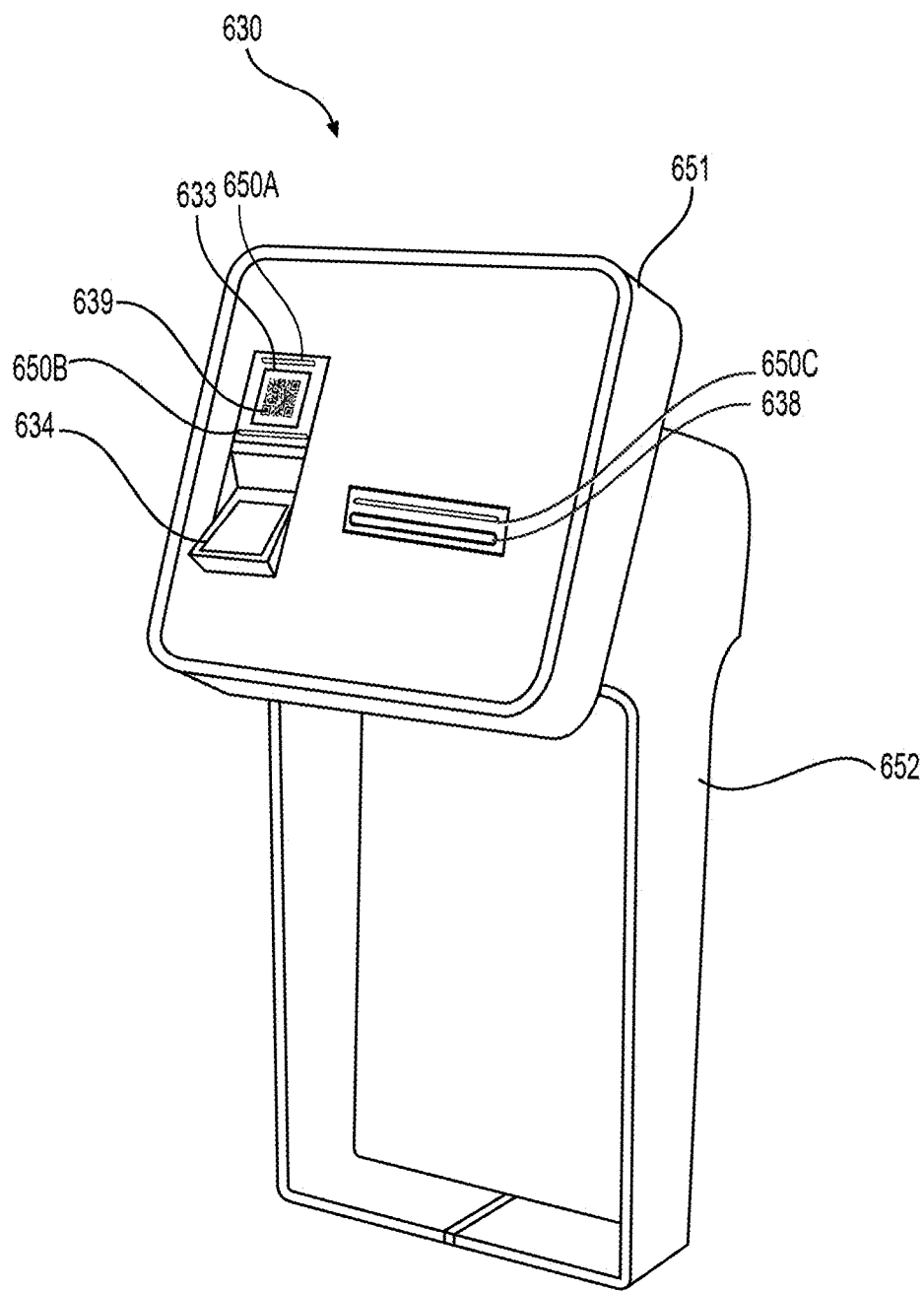
FIG. 9 depicts a perspective view of an exemplary document printing device of the system architecture of FIG. 6.

With reference to FIG. 6 and FIG. 9, document printing device 630 may also include a display 633, a scanning mechanism 634, a printer machine 635, and a dispenser device 636. The display 633 may include any type of display for displaying information of system environment 600. For example, the one or more processors 611 of computer system 610 may cause display 633 (e.g., via network 640) to display a first code 639 (e.g., a QR code or other machine-readable data representation), a printing status, an instruction, an error message, or any other type of display or graphical user interface of system environment 100, as detailed further below. The display 633 may display a new (e.g., different) code periodically (e.g., when the code is a dynamic code), as detailed further below.

Scanning mechanism 634 may include any type of scanning mechanism for scanning a scannable code. For example, scanning mechanism 634 may include a digital or printed barcode data scanning device that can scan or otherwise read 1D or 2D barcodes from digital media (e.g., from a mobile phone display) and/or from printed media (e.g., printed on paper). Scanning mechanism 634 may be configured to scan any type of barcode or similar code, such as, for example, QR codes, data matrix codes, PDF417 codes, EAN 128 codes, UPC-A codes, colorful codes, or any other type of scannable code. The one or more processors 631 of document printing device 630 may transmit or otherwise send authentication information of the scanned code to computer system 610 via network 640, as detailed further below.

Printer machine 635 (shown schematically in FIG. 6) may include any type of printer for printing documents. Printer machine 635 is located in an interior of document printing device 630, and is thus out of view in FIG. 9. Printer machine 635 may include a laser printer, an inkjet printer, or the like. In some examples, printer machine 635 may print with a specialty toner or ink, such as, for example, a magnetic toner or ink, for printing certain types of documents. As used herein, "specialty toner" or "specialty ink" includes any type of toner or ink other than standard toner or ink for printing certain types of documents that require additional security or fraud prevention. For example, printer machine 635 may utilize magnetic ink character recognition (MICR) toner cartridges for printing banking documents, such as cashier's checks or other types of checks or banking documents. The specialty toner or ink may provide added security in printing certain types of documents. It is understood that printer machine 635 may utilize any type of toner or ink, as necessary.

Dispenser device 636 (shown schematically in FIG. 6) may include a device mounted to printer machine 635 for dispensing printed documents from printer machine 635 out of document printing device 630. Dispenser device 636 may be located in an interior of document printing device 630, and is thus out of view in FIG. 9. In some examples, dispenser device 636 may include an arm or other mechanism for interacting with a printed document in order to pull, push, or otherwise urge the printed document out of a slot 638 (shown in FIG. 9) of the document printing device 630. In this way, the printed document may be presented to a user so that the user can pick up or otherwise obtain the printed document. Dispenser device 636 may also be configured to retrieve (e.g., push, pull, or otherwise urge) a printed document back into document printing device 630, as detailed further below. While described herein as a separate device mounted to the printer machine 635, it is understood that the dispenser device 636 may be an integral part of printer machine 635 such that dispenser device 636 is not a separate device.

Document printing device 630 may include one or more communication interfaces 637 (shown in FIG. 6). Communication interface 637 may include one or more cellular radios, Bluetooth, WiFi, near-field communication radios, or other appropriate communication devices for transmitting and receiving information. As can be seen in FIG. 6, communication interface 637 facilitates communication between document printing device 630 and network 640.

Multiple communication interfaces 637 may be included in document printing device 630 for providing multiple forms of communication between document printing device 630 and computer system 610 via network 140. For example, communication may be achieved with network 640 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

As shown in FIG. 9, document printing device 630 may include an interaction component 651 stand attached or otherwise connected to a stand or base 652. The interaction component 651 may house or otherwise contain the components of document printing device 630 with which the user interacts. For example, the interaction component 651 may include display 633, scanning mechanism 634, and slot 638. Thus, a user may interact with document printing device 630 to securely print a document, as detailed further below.

FIGS. 7A-7L depict various display screens 702-720 of the application 623 displayed on computing device 620, according to one or more embodiments. In the examples of FIGS. 7A-7L, reference is made to printing a cashier's check. However, it is understood that system environment 600 may be used for printing any type of document. Further, while a mobile application is depicted in FIGS. 7A-7L, it is understood that application 623 may include any type of application, such as a desktop application, a web application, or the like. Display screens 702-720 may each include a graphical user interface (GUI) of application 623. Thus, application 623 may generate and display the display screens 702-720 on computing device 620. As detailed further below, display screens 702-720 may include interactive components for enabling user input. In some embodiments, some of the display screens 702-720 of FIGS. 7A-7L may be combined to form fewer display screens. In some embodiments, some of the display screens 702-720 may be separated into separate, more numerous display screens 702-720. In some embodiments, some of the display screens 702-720 may be removed while others may be added.

Figures 7A, 7B:
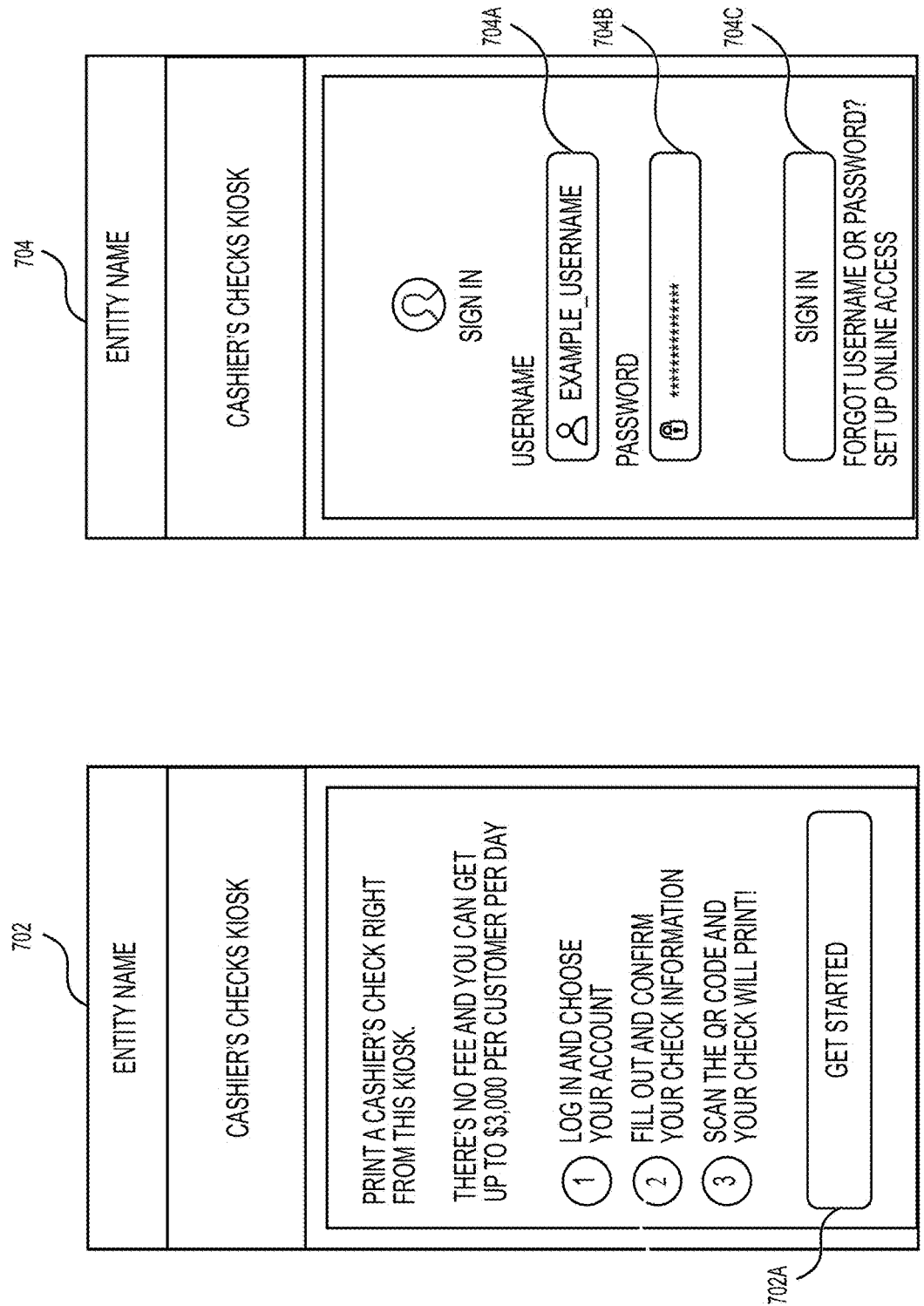

FIG. 7A depicts an exemplary welcome screen 702 of the application 623, according to one or more embodiments. For example, when a user opens or otherwise loads application 623, welcome screen 702 may be displayed. Welcome screen 702 may include general information about generating and printing a document. As shown in FIG. 7A, welcome screen 702 includes information of the steps for generating and printing a cashier's check at a cashier's check kiosk (e.g., document printing device 630). For example, welcome screen 702 may display "1. LOG IN AND CHOOSE YOUR ACCOUNT," "2. FILL OUT AND CONFIRM YOUR CHECK INFORMATION," and "3. SCAN THE QR CODE AND YOUR CHECK WILL PRINT!" Welcome screen 702 may also display information about limits on the document. For example, welcome screen 702 may indicate a maximum currency (e.g., US dollars) amount maximum that may be withdrawn from a customer bank account per day (e.g., "THERE'S NO FEE AND YOU CAN GET UP TO $3,000 PER CUSTOMER PER DAY"). Welcome screen 702 may also include a button 702A or other input mechanism for triggering the process of generating and printing a document. For example, button 702A may prompt application 623 to load and display a login screen 704. While button 702A displays a "GET STARTED" button, it is understood that welcome screen 702 may include any type of button or mechanism for triggering the process of generating and printing a document.

FIG. 7B depicts an exemplary login screen 704 of application 623, according to one or more embodiments. The login screen 704 may display input fields for enabling a user to sign in or otherwise login to the application 623 for generating and printing a document. For example, the login may include a single sign on (SSO) login technique. Accordingly, the login screen 704 may include a username input field 704A and a password input field 704B. The username input field 704A may enable a user to input their username and the password input field 704B may enable the user to input their password for the application 623. Login screen 704 may also include a sign in button 704C or other input mechanism that enables a user to sign in or login to application 623. For example, the user may then push or otherwise select button 704C when the user has input their username and password. While button 704C displays a "SIGN IN" button, it is understood that login screen 704 may include any type of button or mechanism for signing in or otherwise logging in the user to application 623. Login screen 704 may also include a selectable input to enable a user to reset authentication criteria, if needed, and/or to establish online access. For example, login screen 704 may display "FORGOT USERNAME OR PASSWORD?" and/or "SET UP ONLINE ACCESS" and, upon selection of either selectable input, the user may be routed to an appropriate screen for resolving their need. When the user has entered or input their username and password and selects the button 704C, application 623 may verify that the username and password are correct. If correct, application 623 may trigger two-factor authentication.

Two-factor, or multi-factor, authentication may include requiring the user to present two or more pieces of evidence (or factor) to an authentication mechanism. For example, multi-factor authentication may include knowledge (e.g., something only the user knows), possession (e.g., something only the user has), and/or inherence (e.g., something only the user is). In some examples, the two-factor authentication may include the user's username and password (e.g., factor 1) and input of a randomly generated code or pin (e.g., factor 2). However, it is understood that the two-factor authentication may include any type of multi factor authentication techniques now known or to be developed.

Figures 7C, 7D:
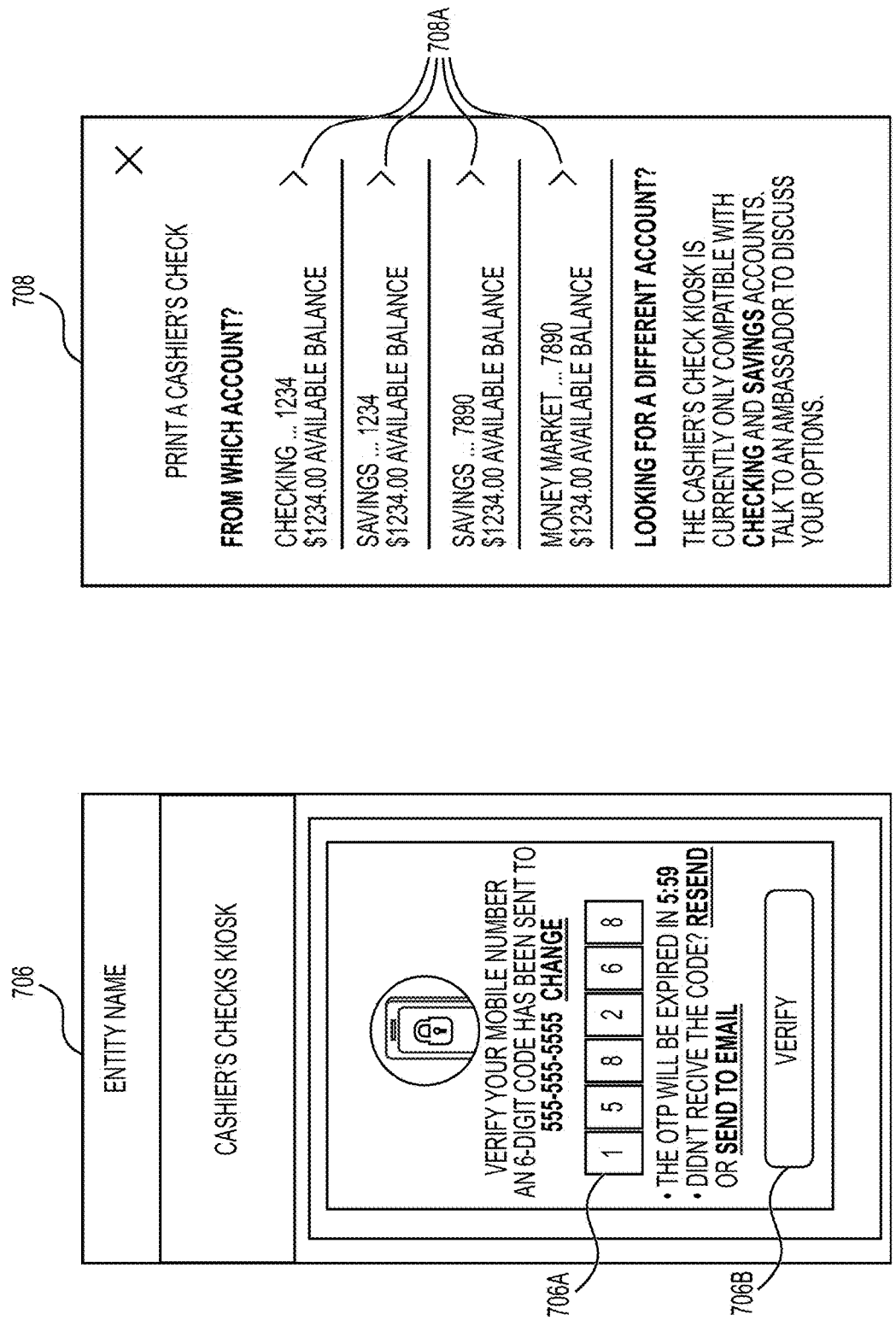

FIG. 7C depicts an exemplary authentication screen 706 of application 623, according to one or more embodiments. The two-factor authentication may trigger application 623 or a third-party system to send a randomly generated code to the user. For example, the randomly generated code may be sent or transmitted to a phone number associated with the user (e.g., via a phone call or via text), an email address associated with the user, or the like. As shown in FIG. 7C, authentication screen 706 may include a code input field 706A and a verify button 706B or other mechanism for triggering verification of the code. The code input filed 706A may enable the user to input the randomly generated code that was sent to the user. The user may then select the button 706B and the application 623 may verify that the code input by the user matches the randomly generated code sent to the user. If the codes match, application 623 may then load an account screen 708, as shown in FIG. 7D. Referring back to FIG. 7C, while button 706B displays a "VERIFY" button, it is understood that authentication screen 706 may include any type of button or mechanism for triggering verification of the code input into code input field 706A. As shown in FIG. 7C, the authentication screen 706 may further include an identification of a user phone number to which the randomly generated code is sent, and a selectable input to modify that number. Additionally, as shown in FIG. 7C, the authentication screen 706 may include an expiration clock detailing the remaining time period for using the randomly generated code, and a selectable input to resend or modify the delivery method for receiving the randomly generated code.

FIG. 7D depicts an exemplary account screen 708 of application 623, according to one or more embodiments. The account screen 708 may display one or more accounts associated with the user. For example, the account screen 708 may display one or more bank accounts 708A associated with the user. The account screen 708 may enable the user to select one of the one or more accounts 708A for use in generating the document, as detailed further below. The accounts 708A may include selectable buttons or the like for enabling a user to select one of the one or more accounts 708A. When the user selects an account 708A, application may then load or otherwise display a document information screen 710. The account screen 708 may further include a selectable input to enable a user to search for another (e.g., unlisted) account.

FIGS. 7E-7G depict an exemplary document information screen 710 of application 623, according to one or more embodiments. As shown in FIG. 7E, document information screen 710 may enable the user to enter information for the document. For example, for a cashier's check, the information may include a payee name, an amount for the cashier's check, and a memo. Accordingly, document information screen 710 may include a payee name input field 710A, an amount input field 710B, and/or a memo input field 710C. The payee name input field 710A may enable the user to input a payee name. The amount input field 710B may enable the user to input the amount. The memo input field 710C may enable the user to input a memo. While the exemplary embodiment herein details a payee name, an amount, and a memo, it is understood that the document information screen 710 may include any type of input field for inputting any type of information for a certain document. Document information screen 710 may also include a review check button 710D or similar mechanism for prompting, loading, and displaying a review screen 712 of application 623, as detailed further below. While review check button 710D displays a "REVIEW CHECK DETAILS" button, it is understood that document information screen 710 may include any type of button or mechanism for triggering the review screen 712.

In some examples, the application 623 may include a minimum, or required, amount of information for generating a document. For example, application 623 may require the payee name and the amount in order to generate a cashier's check. The application 623 may only send the information to the computer system 610 if the minimum or required amount of information has been entered. For example, if the minimum amount of information is not input, application 623 may not enable the user to proceed to sending the information to the computer system 610. As shown in FIG. 7E, the review check button 710D is not yet selectable because the minimum or required amount of information has not been input.

Application 623 may also include one or more restrictions. As shown in FIG. 7F, for cashier's checks or similar banking documents, application 623 may prevent the user from entering an amount greater than an amount available in the corresponding user account. For example, if the user inputs "$20,000" into the amount input field 710B and the user has less than $20,000 in the selected account 708A, application 623 may prevent the user from proceeding to the review screen 712. The application 623 may display an alert or otherwise display a warning on the document information screen 710. For example, the alert or warning may state "[t]his is more money than you have in the account you selected" and the amount input field 710B may be highlighted or otherwise identified. In some examples, application 623 may prevent the user from entering an amount greater than a daily allowable maximum amount. For example, if the daily allowable maximum amount is $3,000, the application 623 may prevent the user from proceeding to the review screen 712 if the user enters more than $3,000.

Once the minimum or required information is input into the input fields 710A-710C, application 623 may enable the user to load or otherwise display the review screen 712. For example, application 623 may enable the review check button 710D such that the review check button 710D is selectable. As shown in FIG. 7G, the user has input "John Doe" into the payee name input field 710A, "$1,000" into the amount input field 710B, and "Car purchase" into the memo input field 710C. The review check button 710D has been modified so as to be selectable since all the minimum or required information has been input and no known restrictions are violated. When the user selects the review check button 710D, application 623 may load or otherwise display the review screen 712.

FIG. 7H depicts an exemplary review screen 712 of application 623, according to one or more embodiments. The review screen 712 may enable the user to review the information input to ensure correctness prior to the information being sent to computer system 610 for generating the document generation data. Review screen 712 may include one or more selectable check boxes 712A or the like for confirming that the information is correct. As shown in FIG. 7H, each line of information for the document may include a selectable check box 712A. The user may review the information and select each box 712A to confirm the corresponding information is correct.

Review screen 712 may also include a confirm check details button 712B or similar mechanism for enabling the user to confirm the information and triggering the information to be sent to computer system 610. For example, when the user selects the confirm check details button 712B, application 623 may load or otherwise display a generate code screen 714, as detailed further below. While button 712B displays a "CONFIRM CHECK DETAILS" button, it is understood that review screen 712 may include any type of button or mechanism for triggering the generate code screen 714. In some examples, the button 712B may be greyed out or otherwise un-selectable if fewer than all boxes 712A are selected. For example, the button 712B may become selectable when all boxes 712A have been selected (e.g., the user has confirmed all the information for the document).

Figure 7J:
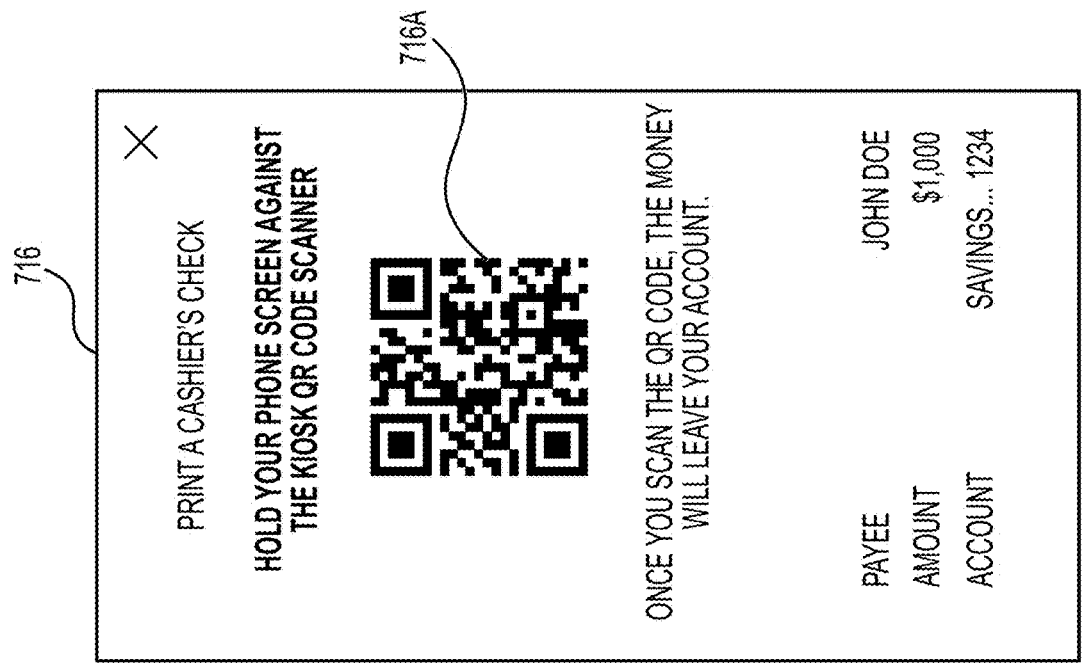
Figure 7I:
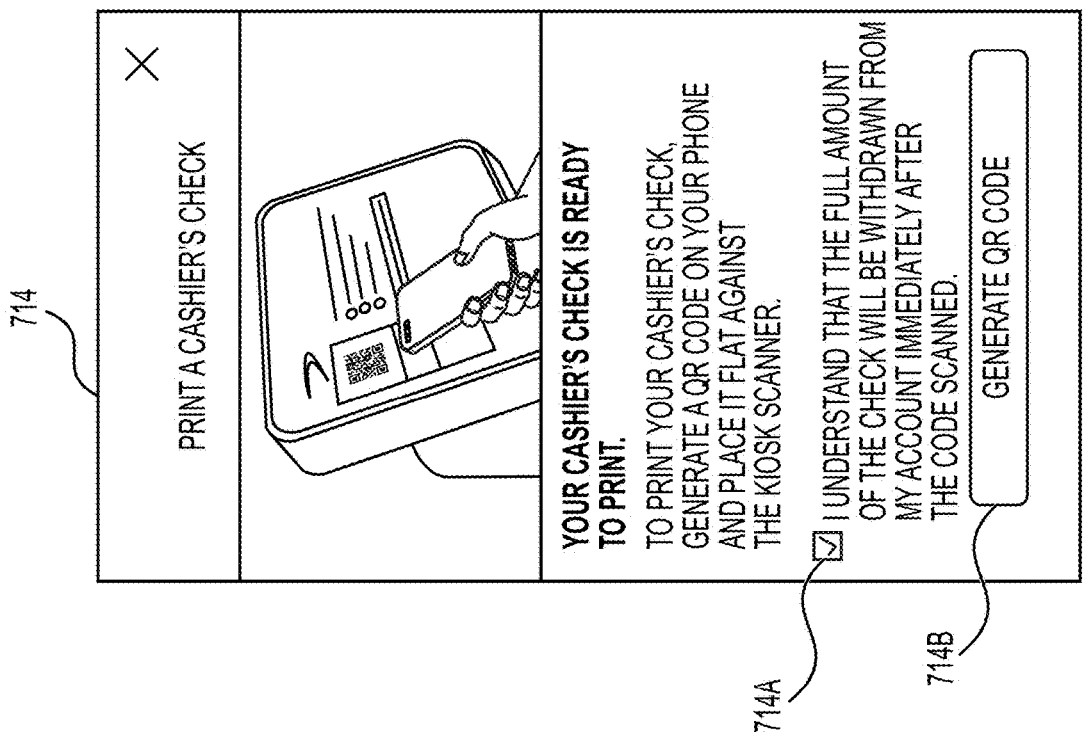

FIG. 7I depicts an exemplary generate code screen 714 of application 623, according to one or more embodiments. When the information of the document has been sent to the computer system 610, application 623 may display the generate code screen 714. For example, computer system 610 may receive the information of the document, verify the information, and generate document generation data, which may include document metadata from which an image of the document may be generated and/or the image of the document, as detailed further below. When the information has been verified and the document generation data has been generated, computer system 610 may prompt application 623 to load and display the generate code screen 714. As shown in FIG. 7I, the generate code screen 714 may include a confirmation check box 714A and a generate code button 714B or similar mechanism. The confirmation check box 714A may enable the user to confirm understanding that the funds indicated in the amount input field 710B will be withdrawn when the code is scanned. Generate code screen 714 may also display one or more instructions to the user. For example, generate code screen 714 may display "TO PRINT YOUR CASHIER'S CHECK, GENERATE A QR CODE ON YOUR PHONE AND PLACE IT FLAT AGAINST THE KIOSK SCANNER." The instructions may include any type of instructions for instructing the user on how to print the document. Further, while a QR code is referred to herein, it is understood that the code may include any type of code, as detailed above.

The generate code button 714B may be configured to trigger application 623 to generate and display a code screen 716, as detailed further below. While button 714B displays a "GENERATE QR CODE" button, it is understood that document information screen 714 may include any type of button or mechanism for triggering the code screen 716. Button 714B may be un-selectable until the user selects the confirmation check box 714A, as shown in FIG. 7I. When the user selects the check box 714A, button 714B may become selectable such that the user may then select button 714B. Upon selection of button 714B, application 623 may generate a code and display a code screen 716.

FIG. 7J depicts an exemplary code screen 716 of application 623, according to one or more embodiments. The code screen 716 may display a second code 716A on computing device 620. The second code 716A may be generated by application 623 and/or by a third-party service. The second code 716A may be a unique scannable code that contains information (e.g., identifying information) of computing device 620 or of a user associated with computing device 620. For example, the information may include the username of the user, an email address of the user, an IP address of computing device 620, an identification associated with the application 623 on computing device 620, and/or any other identifying information for identifying the user and/or computing device 620.

Code screen 716 may also display information for the user. For example, code screen 716 may display the information for the document and may display instructions to the user. The instructions to the user may include instructions for scanning the second code 716A. For example, the instructions may read "HOLD YOUR PHONE SCREEN AGAINST THE KIOSK QR CODE SCANNER" and "ONCE YOU SCAN THE QR CODE, THE MONEY WILL LEAVE YOUR ACCOUNT." It is understood that code screen 716 may display any information or instructions, as necessary or desirable.

When the document is ready to print, the user may scan the first code 639 (shown in FIG. 9) associated with the document printing device 630 using computing device 620. The first code 639 may be displayed on display 633 of document printing device 630, as detailed above. The user may use the one or more cameras 624 of the computing device 620 to scan the first code 639 of the document printing device 630. The first code 639 may include any machine-readable data representation. An example code may include a quick response (QR) code or a bar code. In some examples, the first code 639 may be a first dynamic QR code similar to the first dynamic QR code described above in FIGS. 1-5. However, the code need not be in a form or structure of a code, and may be any type of indicia displayed on display 633 of document printing device 630 that is machine-readable. Additionally or alternatively, the first code 639 may include a uniform resource locator (URL). When the computing device 620 scans the first code 639 using the one or more cameras 624, the application 623 may view and display a web application resource hosted at the URL. The computing device 620 may then send first authentication information of the first code 639 to computer system 610 (e.g., via the application 623). The first authentication information may include identifying information of the document printing device 630 that was, for example, appended to the URL. The identifying information may include, for example, a name of the document printing device 630, a location of the document printing device 630, an IP address of the document printing device 630, and/or any other identifying information for identifying the particular document printing device 630. In some examples, a salt (e.g., random data) that uniquely identifies the newly valid web application session hosted at the URL may also be appended to the URL to prevent malicious users from fraudulating the web application experiences using the same first code 639.

When the second code 716A has been generated, the user may scan the second code 716A at document printing device 630. For example, the user may hold computing device 620 to scanning mechanism 634 of document printing device 630. The second code 716A may include any machine-readable data representation. An example code may include a quick response (QR) code or a bar code. In some examples, the second code 716A generated may be a second dynamic QR code similar to the second dynamic QR code described above in FIGS. 1-5. However, the code need not be in a form or structure of a code, and may be any type of indicia displayed on the computing device 620 that is machine-readable (e.g., by scanning mechanism 634). Scanning mechanism 634 may scan the second code 716A and document printing device 630 may send second authentication information of the second code 716A to computer system 610. The second authentication information may include the identifying information of the user and/or of the computing device 620. For example, the second code 716A may include an encoded, unique identifier of the user that links the user's computing device 620 and/or web application session to a specific document transaction at a point in time, where the identifier may also be encrypted. Given that only the user's computing device 620 has the second code 716A rendered on its display 622, the scanning of the second code 716A by the scanning mechanism 634 of document printing device 630 verifies to the entity 605 that the user is present. Subsequently, in some examples, the document printing device 630 may forward a unique device certificate to the computer system 610 that verifies to the entity 605 that the document printing device 630 is a legitimate device (e.g., is a registered device) authorized to print the document.

The computer system 610 may then verify the first authentication information of the first code 639 and the second authentication information of the second code 716A. For example, the computer system 610 may determine whether the first authentication information matches stored identifying information associated with the document printing device 630. The computer system 610 may also determine whether the second authentication information matches stored identifying information associated with the first user. The computer system 610 may further compare the received certificate to a certificate pre-registered in memory 612 or in a separate data store system to determine whether the certificate matches the device for which the document printing transaction is associated with.

The computer system 610 may use at least a portion of the information for the document received from the user's computing device 620 to generate document generation data that enables generation of an image of the document for printing. For example, the document generation data may include document metadata that is generated as raw data in a string format or other similar format, which may be used to generate the image of the document. The document metadata may include particular aspects of the document information received that are to be included as part of the image of the document to be printed. For example, for a cashier's check, the document metadata may include the payee name, the amount for the cashier's check, and the memo. The document metadata may also include information associated with a third code that is to be printed on the document, as discussed in more detail below.

To provide a non-limiting, illustrative example, when the computer system 610 has verified the first authentication and the second authentication information, the computer system 610 may transmit the document metadata to the document printing device 630, which may be temporarily stored in the memory 632. In some examples, the document metadata transmitted and stored may be encrypted, and the document printing device 630 may be capable of decrypting the document metadata prior to use. The memory 632 or other storage media of the document printing device 630 may also store one or more pre-defined templates that are specific to a given document type. For example, for a cashier's check, the pre-defined template may be generated based on regulatory requirements and/or standards for cashier's checks (e.g., the template may dictate where certain aspects of the document metadata, among other information, is to be placed or positioned). Additionally, for certain types of documents, the regulatory requirements and/or standards may vary amongst different geographical regions. For example, cashier's checks in the United States may include different requirements and/or standards than cashier's checks in Canada. Therefore, the document printing device 630 may store pre-defined templates for the geographical region in which the document printing device 630 is located. In other examples, the computer system 610 may provide a pre-defined template specific to the document type with the document metadata as part of the document generation data. The one or more processors 631 of the document printing device 630 may use the document metadata in conjunction with a pre-defined template specific to the type of document to generate an image of the document, which may also be temporarily stored in the memory 632.

The one or more processors 631 may transmit the image of the document generated to the printer machine 635 along with one or more commands to cause the printer machine 635 to print the image of the document. In some examples, the one or more processors 631 may transmit the image to the printer machine 635 in an encrypted format, where the printer machine 635 is capable of performing decryption prior to printing the image of the document. After an attempt to print the image of the document is made by the printer machine 635 (whether that attempt is successful or not), the document printing device 630 may immediately delete the image and/or document metadata from the device's memory 632. In some examples, prior to deleting the image from the document printing device 630, the document printing device 630 may forward the image to a separate system, such as computer system 610 for document compliance retention.

In some embodiments, rather than sending the document metadata to the document printing device 630 to generate the image, the computer system 610 may instead use at least a portion of the information for the document received from the user's computing device 620 to generate document generation data that includes the image of the document for transmission to the document printing device 630. For example, the processors 611 of computer system 610 may generate the image using the document metadata and a pre-defined template for the document type similar to the above-described templates that is stored in memory 612 or other storage associated with computer system 610. To provide an illustrative example, in such embodiments, when the computer system 610 has verified the first authentication and the second authentication information, the computer system 610 may then transmit the image of the document to the document printing device 630 and cause the document printing device 630 to print the image of the document. For example, upon receipt, the one or more processors 631 of the document printing device 630 may transmit the image to the printer machine 635 along with one or more commands to cause the printer machine 635 to print the image of the document. In this way, the document printing device 630 only receives the image of the document and does not receive the actual underlying metadata for the document. Further, the document printing device 630 may not store the image or any information of the document in the memory 632. Thus, the document printing device 630 may securely print the image of the document without the information for the document being prone to security threats. While the image of the document is printing, application 623 may display a status screen 718.

Figure 7L:
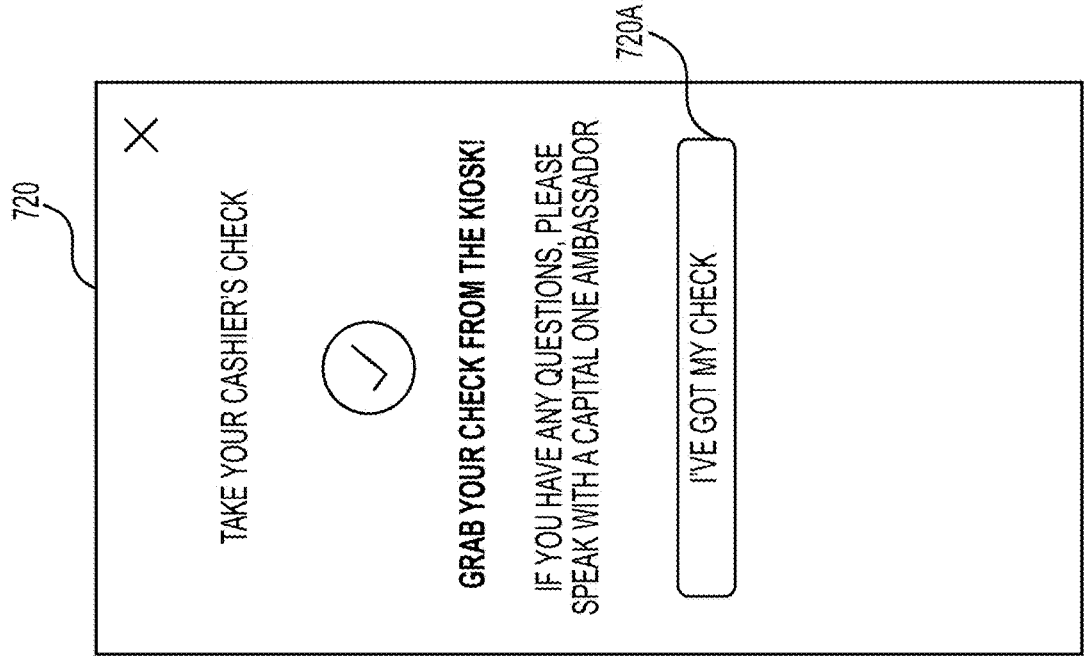
Figure 7K:
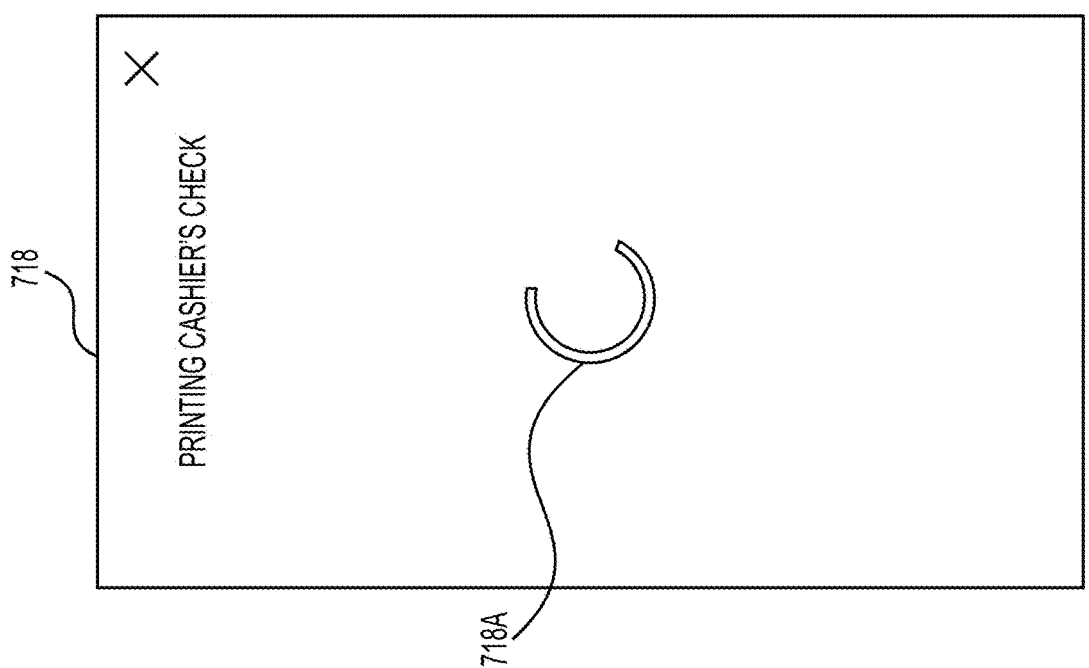

FIG. 7K depicts an exemplary status screen 718 of application 623, according to one or more embodiments. The status screen 718 may display a printing status while the image of the document is printing from printer machine 635. For example, status screen 718 may display a loading icon 718A or similar animated icon to indicate that the image of the document is currently printing. The status screen 718 may also display text indicating the status of the printing. For example, the status screen 718 may display "PRINTING CASHIER'S CHECK." In some examples, the status screen 718 may display a time remaining until printing is complete, a percentage of time that has been completed, or any other indication of the status of the printing. When the image of the document has been completely printed, the dispenser device 636 or similar mechanism may dispense the printed document out of the printer machine 635. For example, the dispenser device 636 may dispense the printed document out of the slot of the document printing device 630. The application 623 may then display a completion screen 720.

FIG. 7L depicts an exemplary completion screen 720 of application 623, according to one or more embodiments. The completion screen 720 may display an indication that the document has completed printing and may display instructions. For example, the completion screen 720 may display "TAKE YOUR CASHIER'S CHECK" and "GRAB YOUR CHECK FROM THE KIOSK!" The completion screen 720 may also include a document confirmation button 720A or similar mechanism for confirming that the user has obtained the printed document from document printing device 630. While button 720A displays a "I'VE GOT MY CHECK" button, it is understood that completion screen 720 may include any type of button or mechanism for confirming the printed document has been obtained. When the user takes the printed document from document printing device 630, the user may select the button 720A to confirm that the user has obtained the printed document.

In some examples, the printed document may include a third scannable code. For example, the user may use the one or more cameras 624 of computing device 620 to scan the third scannable code to confirm the document has been received and/or to activate the document. For example, when the user scans the third scannable code on a cashier's check, the cashier's check may be activated such that it can then be used. When the user has confirmed that the printed document has been received or otherwise obtained, the process of printing the document may be completed. The application 623 may also provide instructions for scanning the third code. For example, the application 623 may display "SCAN THE QR CODE ON THE BACK OF THE CHECK TO ACTIVATE" or similar instructions. The application 623 may display such instructions on completion screen 720 or on a different screen (not shown) after the user has pushed button 720A.

The system environment 600 may also include one or more restrictions for providing additional security when printing a document. The one or more restrictions may include one or more document printing device restrictions associated with document printing device 630. For example, the one or more document printing device restrictions may include a limit on an amount that a respective document printing device 630 may print, a limit on a currency (e.g., US dollar) amount that can be printed per day, and/or a limit on a quantity of documents that may be printed per day from document printing device 630. The one or more restrictions may also include one or more user restrictions associated with the user, with computing device 620, and/or with a user account associated with the user. For example, the one or more user restrictions may include a limit on a currency amount that the user can print per day (e.g., that the computing device 620 can send to be printed), and/or a limit on a quantity of documents that the user can print per day (e.g., that the computing device 620 can send to be printed). It is understood that the one or more restrictions may include any type of restrictions for additional security in printing a document.

The one or more restrictions may also include one or more time restrictions. The one or more time restrictions may include one or more time thresholds for an action to occur. For example, after the user has sent the information for the document to the computer system 610, the computer system 610 may prevent the document from being printed if the user does not scan the scannable codes within a predetermined amount of time since computer system 610 received the information for the document. In some examples, computer system 610 may prevent the document from being printed if the second scannable code is not scanned within a predetermined amount of time of the first scannable code being scanned. Further, the dispenser device 636 may retract the printed document if the user does not take or otherwise remove the printed document from the document printing device 630 within a predetermined amount of time from the printed document being dispensed.

In some examples, document printing device 630 may include one or more proximity sensors, one or more cameras, and/or one or more NFC detection devices. The proximity sensors and/or the one or more cameras may detect when a user is standing within a certain proximity of the document printing device 630. The NFC detection devices may communicate with computing device 620 to detect when computing device 620 is within a certain proximity of document printing device 630.

The system environment 600 may also include one or more fraud prevention techniques. For example, the document printing device 630 may automatically shut down if an unauthorized user attempts to access the document printing device 630. An employee of entity 605 may be notified when this occurs. Further, the information of the document is not stored by the document printing device 630, as detailed above.

The computing device 620 and the document printing device 630 do not communicate directly with each other. For example, the information for the document is sent from the computing device 620 to the computer system 610 and the image of the document is sent from the computer system 610 to the document printing device 630 to be printed. In this way, fraud may be reduced or prevented when generating and printing documents.

In some examples, the document printing device 630 may have full disk encryption of an entirety of storage volumes on the device's hard disk drive (e.g., within memory 632). In such examples, the one or more processors 631 are prevented from executing computations or other automated electronic operations for the purposes of conducting document printing activities unless the disk is decrypted. Network bound disk encryption may be leveraged to provide additional security to system environment 600. For example, to initially encrypt the disk, an encryption framework application on the document printing device 630 may communicate with an encryption service over a private or otherwise approved network to retrieve advertised asymmetric keys to generate a unique, cryptographically strong encryption key from. The document printing device 630 may generate metadata from this key, store the metadata in a secure hardware location (e.g. a trusted platform module (TPM)), and discard the key. To decrypt the disk to perform a document printing operation, for example, the document printing device 630 may communicate metadata to the encryption service over the private or otherwise approved network to recover the encryption key used to decrypt the disk. In some examples, the encryption service may be a service provided by the entity 605 through the computer system 610 (e.g., where the encryption keys are stored in memory 612) or another entity-associated computer system. In other examples, the encryption service may be provided by a third party. Resultantly, additional security may be provided by the system environment 600 by storing encryption keys separate from document printing device 630 as data associated with the document printing device 630 may only be accessible (e.g., readable) when the document printing device 630 is connected to the private network or otherwise approved network.

Serial number parts of the document printing device 630 may be stored by a trusted platform module (TPM) secure locker. A motherboard of document printing device 630 may include a TPM chip for security. For example, the TPM chip provides a unique signing key to validate the hardware of the document printing device 630. For example, the unique signing key may be burned into the chip at manufacture and operates at the lowest level of the device's operation to prevent spoofing by either unauthorized hardware or software attempting to mimic trusted hardware or software. The TPM chip may store hash values for various files and/or hardware that are derived from a hash function. The hash function may be a one-way (e.g., irreversible) cryptographic algorithm which assigns a value to the files and/or hardware given an arbitrary length of fixed bits. The hash values stored in the TPM may be compared against hashes run for the corresponding files and/or hardware during given processes, where a mismatch may at least temporarily halt the process. The TPM chip may also store secrets that can be divulged to the hardware of the document printing device 630 at a high level.

Document printing device 630 may include one or more user guide techniques. For example, the display 633, the scanning mechanism 634, and/or a portion of the dispenser device 636 (e.g., the slot 638 of the document printing device 630) may include lights 650A, 650B, 650C and/or highlights that are activated during certain parts of the process described above. For example, light(s) 650A associated with the display 633 may be illuminated or otherwise activated when the user is required to scan the first code 639 associated with the document printing device 630 so as to draw the user's attention to instructions or the first code 639, displayed via the display 633. Lights 650B associated with the scanning mechanism 634 may be illuminated or otherwise activated when the user is required to scan the first code associated with the computing device 620 so as to draw the user's attention to the scanning mechanism 634. Lights 650C associated with the slot 638 of the document printing device 630 may be illuminated or otherwise activated when the printed document has been dispensed through the slot 638 and is ready for being obtained by the user to draw the user's attention to the instrument as it is dispensed.

Figure 8:
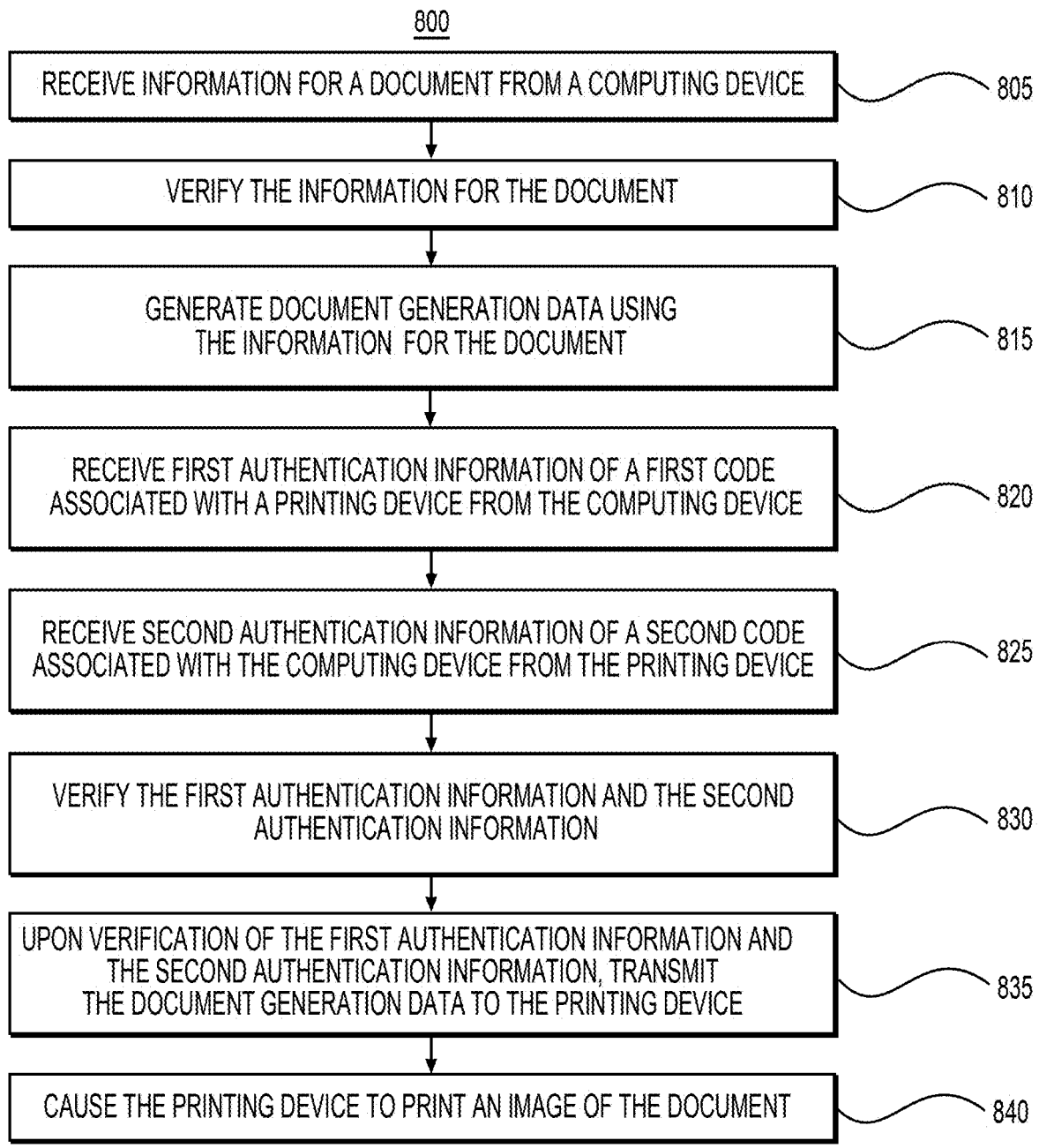
FIG. 8 depicts a flowchart of an exemplary method for securely generating and printing a document, in accordance with some embodiments of the present disclosure.

FIG. 8 depicts a flowchart of a method 800 for securely generating and printing a document. It should be understood that the steps described herein, and the sequence in which they are presented, are merely illustrative such that additional and/or fewer steps may be included without departing from the scope of the present disclosure.

In step 805, the one or more processors 611 of computer system 610 may receive information for a document from a computing device 620. For example, a user may use application 623 to input and send the information for the document to computer system 610 through network 640, as detailed above in FIG. 6.

In step 810, the one or more processors 611 may verify the information for the document. For example, the computer system 610 may verify that the received information includes a minimum or required amount of information for the document, as detailed above. When the document is a cashier's check or similar banking document, the information for the document may include a payee name, a currency amount, and/or a memo. The computer system 610 may also verify that the currency amount for the document is less than or equal to an amount that the user has in a user account of the entity 605.

In step 815, upon verification of the information for the document, the one or more processors 611 may generate document generation data using at least a portion of the information for the document received from the computing device 620. As one example, the document generation data generated by the one or more processors 611 of computer system 610 may include document metadata. The document metadata may include at least a portion of the information for the document formatted as raw or text data (e.g., in a string format or other similar format). The document metadata may include the portion of the document information received that is to be included within an image of the document to be printed. For example, for a cashier's check or similar banking document, the document metadata may include at least the payee name, the currency amount, and the memo to be printed on the check. The document metadata may also include information associated with a third code that is to be printed on the document. Additionally, in some examples, the document generation data generated by the one or more processors 611 of computer system 610 may include an image of the document (e.g., generated from the document metadata and one or more pre-defined templates for the given document type, where the document metadata fills in or populates the template(s)). The image of the document may include any type of image file, such as, for example, JPEG (or JPG), TIFF (or TIF), PDF, BMP, PNG, GIF, RAW, or the like. It is understood that the document metadata and/or the image of the document may be generated by the one or more processors 611 at any time after verification of the information for the document. For example, the one or more processors 611 may generate the document metadata and/or the image of the document after the first and second authentication information has been verified, as detailed below.

In step 820, the one or more processors 611 may receive first authentication information of a first code associated with a printing device 630 from the computing device 620. The first authentication information may include identifying information of the printing device 630, as detailed above.

In step 825, the one or more processors 611 may receive second authentication information of a second code associated with the computing device 620 from the printing device 630. The second authentication information includes identifying information of the computing device 620, as detailed above.

In step 830, the one or more processors 611 may verify the first authentication information and the second authentication information. The verifying may include comparing the identifying information of the printing device 630 with stored identifying information of the printing device 630, and comparing the identifying information of the computing device 620 with stored identifying information of the computing device 620, as detailed above. Based on the comparing, the one or more processors 611 may verify the first authentication information and the second authentication information. For example, if the identifying information of the printing device 630 matches the stored identifying information of the printing device 630, the one or more processors 611 may verify the first authentication information. Likewise, if the identifying information of the computing device 620 matches the stored identifying information of the computing device 620, the one or more processors 611 may verify the second authentication information. The one or more processors 611 may also verify that the second authentication information is received within a predetermined time limit from when the first authentication information is received. If the second authentication information is received within the predetermined time limit, the one or more processors 611 may verify the first authentication information and the second authentication information. If the second authentication is not received within the predetermined time limit, the one or more processors 611 may not verify the first authentication information and the second authentication information, and the process may end such that the user may be prevented from printing the document.

In step 835, upon verification of the first authentication information and the second authentication information, the one or more processors 611 may transmit the document generation data (e.g., the document metadata and/or the image of the document) to the printing device 630 through network 640.

In step 840, the one or more processors 611 may cause the printing device 630 to print the image of the document. In some examples, when only document metadata is generated and transmitted by the one or more processors 611, the one or more processors 611 may further cause the printing device 630 to generate an image of the document (e.g., from the document metadata) for printing.

In some examples, the one or more processors 611 may receive third authentication information of a third code (e.g., a QR code) on the printed document. For example, the user may use the cameras 624 of computing device 620 to scan the third code on the printed document. For cashier's check, scanning the third code may activate the cashier's check as valid tender such that the cashier's check may be used.

As detailed above, the method 800 may ensure security of the information for the document, and thus provide for increased security in the overall process of generating and printing a document. The systems and methods described herein may also limit required user interactions with tellers or other administrators, may permit certain actions off regular business hours, and/or may provide other customer-centric benefits.

It should be understood that embodiments in this disclosure are exemplary only, and that other embodiments may include various combinations of features from other embodiments, as well as additional or fewer features. For example, while some of the embodiments above pertain to claim 1, any suitable activity may be used.

In general, any process or operation discussed in this disclosure that is understood to be computer-implementable, such as the processes illustrated in FIGS. 3A-5 and 7A-8, may be performed by one or more processors of a computer system, such any of the systems or devices in the system 100 of FIG. 1 or the system environment 600 of FIG. 6, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1 or FIG. 6. One or more processors of a computer system may be included in a single computing device or distributed among a plurality of computing devices. A memory of the computer system may include the respective memory of each computing device of the plurality of computing devices.

FIG. 10 is a simplified functional block diagram of a computer 1000 that may be configured as a device for executing the methods of FIGS. 3A-5 and 7A-8, according to exemplary embodiments of the present disclosure. For example, the computer 1000 may be configured as the computing device 110, the financial service provider system 120, the user device 130, the computer system 610, the computing device 620, the document printing device 630, and/or another system according to exemplary embodiments of this disclosure. In various embodiments, any of the systems herein may be a computer 1000 including, for example, a data communication interface 1020 for packet data communication. The computer 1000 may communicate with one or more other computers 1000 using the electronic network 1026. The electronic network 1026 may include a wired or wireless network similar to the network 140 depicted in FIG. 1 and/or the network 640 depicted in FIG. 6.

The computer 1000 also may include a central processing unit ("CPU") 1002, in the form of one or more processors, for executing program instructions. The computer 1000 may include an internal communication bus 1008, and a storage unit 1006 (such as ROM, HDD, SDD, etc.) that may store data on a computer readable medium 1022, although the computer 1000 may receive programming and data via network communications. The computer 1000 may also have a memory 1004 (such as RAM) storing instructions 1024 for executing techniques presented herein, although the instructions 1024 may be stored temporarily or permanently within other modules of computer 1000 (e.g., processor 1002 and/or computer readable medium 1022). The computer 1000 also may include input and output ports 1012 and/or a display 1010 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

As used herein, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to customer devices that may include mobile computing devices. Those skilled in the art will recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method for securely printing a document performed by a printing device, the method comprising:

displaying a first code on a display of the printing device, wherein the first code is read by a user computing device associated with a user and transmitted to a computer system for verification;

receiving, as input to the printing device, a second code having been provided by the computer system to the user computing device in response to the computer system receiving a request from the user to generate and print a document;

transmitting the second code to the computer system for verification;

receiving document generation data from the computer system in response to the computer system determining a time elapsed between the transmitting of the first code to the computer system and the transmitting of the second code to the computer system is less than a threshold time;

printing, by a printer machine of the printing device, the document based on the document generation data;

receiving, by a dispenser device of the printing device separate from the printer machine, the document printed by the printer machine;

dispensing, by the dispenser device, the document from the printing device; and in response to a predetermined amount of time expiring from the dispensing of the document, retracting, by the dispenser device, the document dispensed from the printing device.

2. The method of claim 1, wherein the document generation data received includes document metadata that enables generation of an image of the document, and printing the document further comprises:

generating the image of the document based on the document metadata from the document generation data; and printing the image of the document.

3. The method of claim 2, wherein generating the image of the document comprises:

generating the image of the document further based on a pre-defined template specific to a type of the document.

4. The method of claim 3, wherein one of:

the document generation data received further includes the pre-defined template specific to the type of the document; or the printing device is configured to store a plurality of pre-defined templates specific to a plurality of types of documents, and the pre-defined template specific to the type of the document is retrieved from the stored plurality of pre-defined templates for use in generating the image of the document.

5. The method of claim 3, wherein the document generation data received includes information for the document received as part of the request, a portion of the information corresponds to one or more content inputs specific to the type of the document, and generating the image of the document further comprises:

populating the portion of the information into the one or more content inputs specific to the type of the document, wherein the pre-defined template identifies a position of the one or more content inputs in the document.

6. The method of claim 1, wherein the document generation data received includes an image of the document, and printing the document further comprises:

printing the image of the document.

7. The method of claim 1, wherein receiving the document generation data from the computer system comprises:
receiving encrypted document generation data from the computer system; and
decrypting the encrypted document generation data.

8. The method of claim 1, further comprising:
transmitting a unique device certificate of the printing device to the computer system, wherein the computer system uses the unique device certificate to verify the printing device is a registered device authorized to print the document.

9. The method of claim 1, wherein the first code includes identifying information of the printing device, and the second code includes identifying information of the user computing device.

10. The method of claim 1, wherein receiving the document generation data from the computer system further comprises:
receiving the document generation data in response to the computer system determining a time elapsed between the computer system receiving the request and the transmitting of the second code to the computer system is less than a threshold time.

11. A printing device comprising:
an interaction component;
a printer machine;
a dispenser device, wherein the dispenser device is separate from the printer machine;
at least one memory storing instructions; and
at least one processor configured to execute the instructions to perform operations including:
displaying a first code via the interaction component, wherein the first code is read by a user computing device associated with a user and transmitted to a computer system for verification;
receiving, as input via the interaction component, a second code having been provided by the computer system to the user computing device in response to the computer system receiving a document request from the user;
transmitting the second code to the computer system for verification;
receiving document generation data associated with the document request from the computer system in response to the computer system determining a time elapsed between the transmitting of the first code to the computer system and the transmitting of the second code to the computer system is less than a threshold time;
causing the printer machine to print a document based on the document generation data;
in response to the dispenser device receiving the document printed by the printer machine, causing the dispenser device to urge the document at least partially out of the printing device; and
in response to a predetermined amount of time expiring from the urging of the document at least partially out of the printing device, causing the dispenser device to retrieve the document back into the printing device.

12. The printing device of claim 11, wherein the interaction component includes a slot, and the dispenser device is configured to urge the document at least partially out of the printing device via the slot.

13. The printing device of claim 11, wherein causing the printer machine to print the document comprises:
transmitting an image of the document and one or more commands to the printer machine to cause the printer machine to print the image of the document, wherein the image of the document is generated by the printing device based on document metadata included in the document generation data or the image of the document is received as part of the document generation data.

14. The printing device of claim 13, further comprising:
encrypting the image; and
transmitting the encrypted image and the one or more commands to the printer machine to cause the printer machine to print the document, wherein the printer machine is configured to decrypt the encrypted image prior to printing.

15. The printing device of claim 14, wherein when the image of the document is generated by the printing device based on the document metadata, generating the image of the document includes:
generating the image of the document further based on a pre-defined template specific to a type of the document, wherein one of:
the document generation data received further includes the pre-defined template specific to the type of the document; or
a plurality of pre-defined templates specific to a plurality of types of documents are stored by the at least one memory, and the pre-defined template specific to the type of the document is retrieved from the stored plurality of pre-defined templates for use in generating the image of the document.

16. The printing device of claim 11, wherein the operations further include:
storing the document generation data temporarily in the at least one memory of the printing device; and
deleting the document generation data from the at least one memory in response to detecting an attempt to print the document.

17. The printing device of claim 11, wherein the interaction component includes a scanning mechanism, and receiving the second code comprises:
reading, by the scanning mechanism, the second code as the second code is displayed on the user computing device.

18. The printing device of claim 11, wherein the interaction component includes a display, the first code is displayed via the display and includes identifying information of the printing device, and the second code includes identifying information of the user computing device.

19. A method for securely printing a document performed by a printing device, the method comprising:
displaying a first code on a display of the printing device, wherein the first code is read by a user computing device associated with a user and transmitted to a computer system for verification;
receiving, as input to the printing device, a second code provided by the computer system to the user computing device that identifies a request for the document initiated by the user and received by the computer system;
transmitting the second code to the computer system for verification;
receiving document generation data associated with the request from the computer system in response to the computer system determining a time elapsed between the transmitting of the first code to the computer system and the transmitting of the second code to the computer system is less than a threshold time;

printing, by a printer machine of the printing device, the document based on the document generation data;

receiving, by a dispenser device of the printing device separate from the printer machine, the document printed by the printer machine;

dispensing, by the dispenser device, a portion of the document out of the printing device to enable removal of the document from the printing device by the user;

monitoring an amount of time elapsed from the dispensing; and in response to determining the amount of time elapsed reaches a predetermined amount of time, and the document has not been removed, retracting, by the dispenser device, the portion of document back into the printing device.

* * * * *